United States Patent
Thompson et al.

(10) Patent No.: US 9,413,830 B2
(45) Date of Patent: Aug. 9, 2016

(54) APPLICATION STREAMING SERVICE

(71) Applicant: Amazon Technologies, Inc., Reno, NV (US)

(72) Inventors: Jonathan Paul Thompson, Seattle, WA (US); Roumen Bogomilov Antonov, Irvine, CA (US); James Jonathan Morris, Duvall, WA (US); Gerard Joseph Heinz, II, Seattle, WA (US); Vinod Murli Mamtani, Bellevue, WA (US); Pavan Kumar Surishetty, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 440 days.

(21) Appl. No.: 14/077,023

(22) Filed: Nov. 11, 2013

(65) Prior Publication Data

US 2015/0134840 A1    May 14, 2015

(51) Int. Cl.
*H04L 29/08*    (2006.01)

(52) U.S. Cl.
CPC .......... *H04L 67/141* (2013.01); *H04L 67/1021* (2013.01); *H04L 67/1027* (2013.01)

(58) Field of Classification Search
CPC ......... H04L 45/04; H04L 45/54; H04L 47/12; H04L 47/125; H04L 12/4641; H04L 45/66; H04L 49/70; H04L 45/00; H04L 45/302; H04L 47/122; H04L 63/0272
See application file for complete search history.

(56) References Cited

U.S. PATENT DOCUMENTS

| | | | |
|---|---|---|---|
| 5,774,668 A * | 6/1998 | Choquier | G06F 9/505 370/480 |
| 5,956,489 A * | 9/1999 | San Andres | G06F 11/1662 709/221 |
| 6,343,313 B1 | 1/2002 | Salesky et al. | |
| 6,525,731 B1 | 2/2003 | Suits et al. | |
| 6,556,206 B1 | 4/2003 | Benson et al. | |
| 6,694,346 B1 | 2/2004 | Aman et al. | |
| 7,068,729 B2 | 6/2006 | Shokrollahi et al. | |
| 7,177,448 B1 | 2/2007 | Sah | |
| 7,249,291 B2 | 7/2007 | Rasmussen et al. | |
| 7,447,235 B2 | 11/2008 | Luby et al. | |
| 7,660,245 B1 | 2/2010 | Luby | |

(Continued)

FOREIGN PATENT DOCUMENTS

WO    WO 2013/069654 A1    5/2013

OTHER PUBLICATIONS

U.S. Appl. No. 14/317,441, filed Jun. 27, 2014, Kalman et al.

(Continued)

*Primary Examiner* — Sargon Nano
(74) *Attorney, Agent, or Firm* — Baker & Hostetler LLP

(57) ABSTRACT

A method can include a node receiving a token redemption request from a client computing device. The node can determine a destination host management service based at least in part on a geographic proximity of the destination host management service to the client computing device. The destination host management service can be one of a plurality of host management systems distributed across a plurality of data centers. The node can route the token redemption request to the destination host management service. The destination host management service can determine a destination host running an application in one of the plurality of data centers and provision a session between the client computing device and the application running in the destination host.

21 Claims, 13 Drawing Sheets

(56) References Cited

U.S. PATENT DOCUMENTS

| | | | |
|---|---|---|---|
| 7,711,068 | B2 | 5/2010 | Shokrollahi et al. |
| 7,720,174 | B2 | 5/2010 | Shokrollahi et al. |
| 7,721,184 | B2 | 5/2010 | Luby et al. |
| 7,956,772 | B2 | 6/2011 | Shokrollahi et al. |
| 8,065,676 | B1 | 11/2011 | Sahai et al. |
| 8,185,809 | B2 | 5/2012 | Luby et al. |
| 8,279,755 | B2 | 10/2012 | Luby |
| 8,458,567 | B2 | 6/2013 | Luby et al. |
| 8,473,557 | B2 * | 6/2013 | Ramakrishnan ...... G06F 9/4856 709/206 |
| 8,478,816 | B2 | 7/2013 | Parks et al. |
| 8,484,284 | B2 | 7/2013 | Elliott et al. |
| 8,527,646 | B2 | 9/2013 | Khatib et al. |
| 8,572,251 | B2 | 10/2013 | Srinivas et al. |
| 8,671,163 | B2 | 3/2014 | Luby et al. |
| 9,192,859 | B2 | 11/2015 | Perlman et al. |
| 2002/0129159 | A1 | 9/2002 | Luby et al. |
| 2002/0176367 | A1 | 11/2002 | Gross |
| 2003/0091000 | A1 | 5/2003 | Chu et al. |
| 2003/0105925 | A1 * | 6/2003 | Yoshimura ........ G06F 17/30902 711/118 |
| 2003/0212742 | A1 | 11/2003 | Hochmuth et al. |
| 2004/0057379 | A1 | 3/2004 | Chen et al. |
| 2004/0073903 | A1 * | 4/2004 | Melchione ................ G06F 8/60 717/172 |
| 2004/0101274 | A1 | 5/2004 | Foisy et al. |
| 2005/0135305 | A1 * | 6/2005 | Wentink ............... H04B 7/2126 370/329 |
| 2006/0036756 | A1 | 2/2006 | Driemeyer et al. |
| 2006/0072831 | A1 | 4/2006 | Pallister |
| 2006/0088093 | A1 | 4/2006 | Lakaniemi et al. |
| 2007/0094094 | A1 | 4/2007 | Yaron et al. |
| 2007/0140359 | A1 | 6/2007 | Ehret et al. |
| 2007/0156725 | A1 | 7/2007 | Ehret et al. |
| 2007/0226364 | A1 | 9/2007 | Landspurg |
| 2007/0265073 | A1 | 11/2007 | Novi et al. |
| 2008/0008093 | A1 | 1/2008 | Wang et al. |
| 2008/0104608 | A1 | 5/2008 | Hyser et al. |
| 2008/0172140 | A1 | 7/2008 | Kim et al. |
| 2009/0131177 | A1 | 5/2009 | Pearce |
| 2009/0195537 | A1 | 8/2009 | Qiu et al. |
| 2009/0249440 | A1 * | 10/2009 | Platt .................... H04L 63/0815 726/1 |
| 2009/0251488 | A1 | 10/2009 | Clavel |
| 2009/0307565 | A1 | 12/2009 | Luby et al. |
| 2010/0017686 | A1 | 1/2010 | Luby et al. |
| 2010/0063992 | A1 | 3/2010 | Ma et al. |
| 2010/0156892 | A1 | 6/2010 | Chan et al. |
| 2010/0289803 | A1 | 11/2010 | Klosowski et al. |
| 2010/0312891 | A1 * | 12/2010 | Pairault ............... G06F 17/3087 709/226 |
| 2011/0002377 | A1 | 1/2011 | Raveendran |
| 2011/0002378 | A1 | 1/2011 | Raveendran |
| 2011/0002379 | A1 | 1/2011 | Raveendran |
| 2011/0002399 | A1 | 1/2011 | Raveendran |
| 2011/0002405 | A1 | 1/2011 | Raveendran |
| 2011/0040894 | A1 | 2/2011 | Shrum et al. |
| 2011/0055372 | A1 | 3/2011 | Elyashev et al. |
| 2011/0055602 | A1 | 3/2011 | Kamay et al. |
| 2011/0134111 | A1 | 6/2011 | Stone |
| 2011/0252181 | A1 * | 10/2011 | Ouye ................ G06F 17/30519 711/101 |
| 2011/0252356 | A1 | 10/2011 | Morris |
| 2011/0276689 | A1 * | 11/2011 | Rosen ................ G06F 17/3087 709/224 |
| 2011/0283045 | A1 * | 11/2011 | Krishnan ............... G06F 9/5027 711/102 |
| 2011/0304634 | A1 | 12/2011 | Urbach |
| 2012/0004042 | A1 | 1/2012 | Perry et al. |
| 2012/0005316 | A1 | 1/2012 | Perry et al. |
| 2012/0069036 | A1 | 3/2012 | Dharmapurikar |
| 2012/0084774 | A1 | 4/2012 | Post et al. |
| 2012/0089980 | A1 | 4/2012 | Sharp et al. |
| 2012/0173715 | A1 | 7/2012 | Selitser et al. |
| 2012/0188341 | A1 | 7/2012 | Klein Gunnewiek et al. |
| 2012/0192031 | A1 | 7/2012 | Liu et al. |
| 2012/0224490 | A1 | 9/2012 | Ikada |
| 2012/0331147 | A1 | 12/2012 | Dutta et al. |
| 2013/0007499 | A1 | 1/2013 | Moy |
| 2013/0016107 | A1 | 1/2013 | Dharmapurikar |
| 2013/0031161 | A1 | 1/2013 | Yang |
| 2013/0036476 | A1 * | 2/2013 | Roever .................... H04L 63/08 726/27 |
| 2013/0038618 | A1 | 2/2013 | Urbach |
| 2013/0106855 | A1 | 5/2013 | Urbach |
| 2013/0151683 | A1 | 6/2013 | Jain et al. |
| 2013/0151803 | A1 | 6/2013 | Tofano |
| 2013/0210522 | A1 | 8/2013 | Dharmapurikar |
| 2013/0344961 | A1 | 12/2013 | Iannetta |
| 2013/0344966 | A1 | 12/2013 | Mustafa |
| 2014/0143301 | A1 | 5/2014 | Watson et al. |
| 2014/0173060 | A1 * | 6/2014 | Jubran .................. G06F 9/5072 709/220 |
| 2014/0173674 | A1 | 6/2014 | Wolman et al. |
| 2014/0176583 | A1 | 6/2014 | Abiezzi et al. |
| 2014/0279581 | A1 | 9/2014 | Devereaux et al. |
| 2014/0297798 | A1 | 10/2014 | Bakalash et al. |
| 2014/0337835 | A1 | 11/2014 | Johnson |
| 2015/0084981 | A1 | 3/2015 | Clarberg |
| 2015/0091903 | A1 | 4/2015 | Costello et al. |
| 2015/0130789 | A1 | 5/2015 | Heinz et al. |
| 2015/0130813 | A1 | 5/2015 | Taraki et al. |
| 2015/0130814 | A1 | 5/2015 | Taraki et al. |
| 2015/0130815 | A1 | 5/2015 | Taraki et al. |
| 2015/0131969 | A1 | 5/2015 | Taraki et al. |
| 2015/0133214 | A1 | 5/2015 | Heath et al. |
| 2015/0133215 | A1 | 5/2015 | Heinz et al. |
| 2015/0133216 | A1 | 5/2015 | Heinz et al. |
| 2015/0134770 | A1 | 5/2015 | Heinz et al. |
| 2015/0134771 | A1 | 5/2015 | Kalman et al. |
| 2015/0134772 | A1 | 5/2015 | Heinz et al. |
| 2015/0134779 | A1 | 5/2015 | Thompson et al. |
| 2015/0142925 | A1 | 5/2015 | Hix et al. |
| 2015/0249623 | A1 | 9/2015 | Phillips et al. |
| 2015/0331813 | A1 | 11/2015 | Perrin et al. |

OTHER PUBLICATIONS http://commons.wikimedia.org/wiki/File:Stereoscopic_3D_render_from_Blender.jpg; File: Stereoscopic 3D render from Blender.jpg; Wikimedia; Mar. 4. 2012; accessed Nov. 12, 2013; 2 pages.
http://en.wikipedia.org/wiki/Mipmap; Wikipedia; Oct. 29, 2013; accessed Nov. 10, 2013; 3 pages.
http://en.wikipeida.org/wiki/Texture_atlas; Texture atlas; Wikipedia; Sep. 28, 2013;.accessed Nov. 10, 2013; 2 pages.
http://msdn.microsoft.com/en-us/library/windows/hardware/ff569022(v=vs.85).aspx; Pipelines for Direct3D Version 11; Microsoft; Oct. 14, 2013; accessed Nov. 9, 2013; 3 pages.

* cited by examiner

APPLICATION STREAMING SERVICE

CROSS REFERENCE TO RELATED APPLICATIONS

This application is related to the following applications, each of which is hereby incorporated by reference in its entirety: U.S. patent application Ser. No. 14/076,718 filed Nov. 11, 2013, entitled "VIDEO ENCODING BASED ON AREAS OF INTEREST"; U.S. patent application Ser. No. 14/076,821 filed Nov. 11, 2013, entitled "ADAPTIVE SCENE COMPLEXITY BASED ON SERVICE QUALITY"; U.S. patent application Ser. No. 14/077,127 filed Nov. 11, 2013, entitled "SERVICE FOR GENERATING GRAPHICS OBJECT DATA"; U.S. patent application Ser. No. 14/077,136 filed Nov. 11, 2013, entitled "IMAGE COMPOSITION BASED ON REMOTE OBJECT DATA"; U.S. patent application Ser. No. 14/077,165 filed Nov. 11, 2013, entitled "MULTIPLE PARALLEL GRAPHICS PROCESSING UNITS"; U.S. patent application Ser. No. 14/077,084 filed Nov. 11, 2013, entitled "ADAPTIVE CONTENT TRANSMISSION"; U.S. patent application Ser. No. 14/077,180 filed Nov. 11, 2013, entitled "VIEW GENERATION BASED ON SHARED STATE"; U.S. patent application Ser. No. 14/077,186 filed Nov. 11, 2013, entitled "MULTIPLE STREAM CONTENT PRESENTATION"; U.S. patent application Ser. No. 14/077,149 filed Nov. 11, 2013, entitled "DATA COLLECTION FOR MULTIPLE VIEW GENERATION"; U.S. patent application Ser. No. 14/077,142 filed Nov. 11, 2013, entitled "STREAMING GAME SERVER VIDEO RECORDER"; U.S. patent application Ser. No. 14/076,815 filed Nov. 11, 2013, entitled "LOCATION OF ACTOR RESOURCES" ; U.S. patent application Ser. No. 14/077,146 filed Nov. 11, 2013, entitled "SESSION IDLE OPTIMIZATION FOR STREAMING SERVER"; U.S. patent application Ser. No. 61/902,740 filed Nov. 11, 2013, entitled "EFFICIENT BANDWIDTH ESTIMATION".

BACKGROUND

Developers produce applications that can be run on computing devices. The applications can provide a user of the computing device with functionality. For example, email client applications can provide users with the ability to compose, send and receive email messages on the computing device; social network applications can allow users to interact within a social network from the computing device; gaming applications can allow a user to play a game on the computing device and/or participate in an online multiplayer game using the computing device; music and audio applications can allow a user to listen to and/or edit music and audio on the computing device; photo and video applications can allow a user to capture and/or edit pictures and video; and so forth.

Any number of applications can be run on a computing device. Each application provides a user of the mobile device with some functionality. The ability to run different applications—each of which can provide different functionality—on a computing device can allow a user of the computing device to perform many different functions using the same computing device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

One difficulty with running many applications on a single computing device is the possibility that the computing device has limited computing resources. For example, in the case of a cell phone or a tablet computer, the amount of memory and processing power in the computing device may be less than the amount of memory and processing power that may be available in other types of computing device, such as a desktop computer or a laptop computer. Limitations on computing resources in a computing devices can limit the number of applications that can be installed on a computing device and limit the types of applications that can properly run on a computing device.

The present disclosure generally describes techniques and systems for hosting and running applications on a host computing system and streaming application content to remote computing devices. A computing system can request that an application be executed by a remote host computing system. The host computing system can include a host that executes the application and streams audio and video application content to the computing devices. The computing device can render the video and audio information and accept control inputs from a user. The computing device can send the control inputs to the host for controlling the application running on the host computing system.

The host computing system can include a host management service that can manage the provisioning and usage of hosts, requests by computing devices for operation of applications, informing computing devices how to communicate with the appropriate hosts for their applications and the like.

The computing devices and the hosts running the applications can communication application content and control inputs directly with each other. In this way, the host management service can perform system management without being overloaded by handling data communicated between the computing devices and the hosts running the applications.

Host computing systems can have significantly greater access to computing resources than remote computing devices. This can allow a computing device to have access to applications that the computing device would not normally be able to run. In addition, a client application can operate on the computing device to enable the computing device to interact with the application running remotely in a host computing system. However, the size and computing requirements of the client application operating on the computing device can be significantly less than the size and computing requirements of the application operating on the host computing system.

Figure 1:
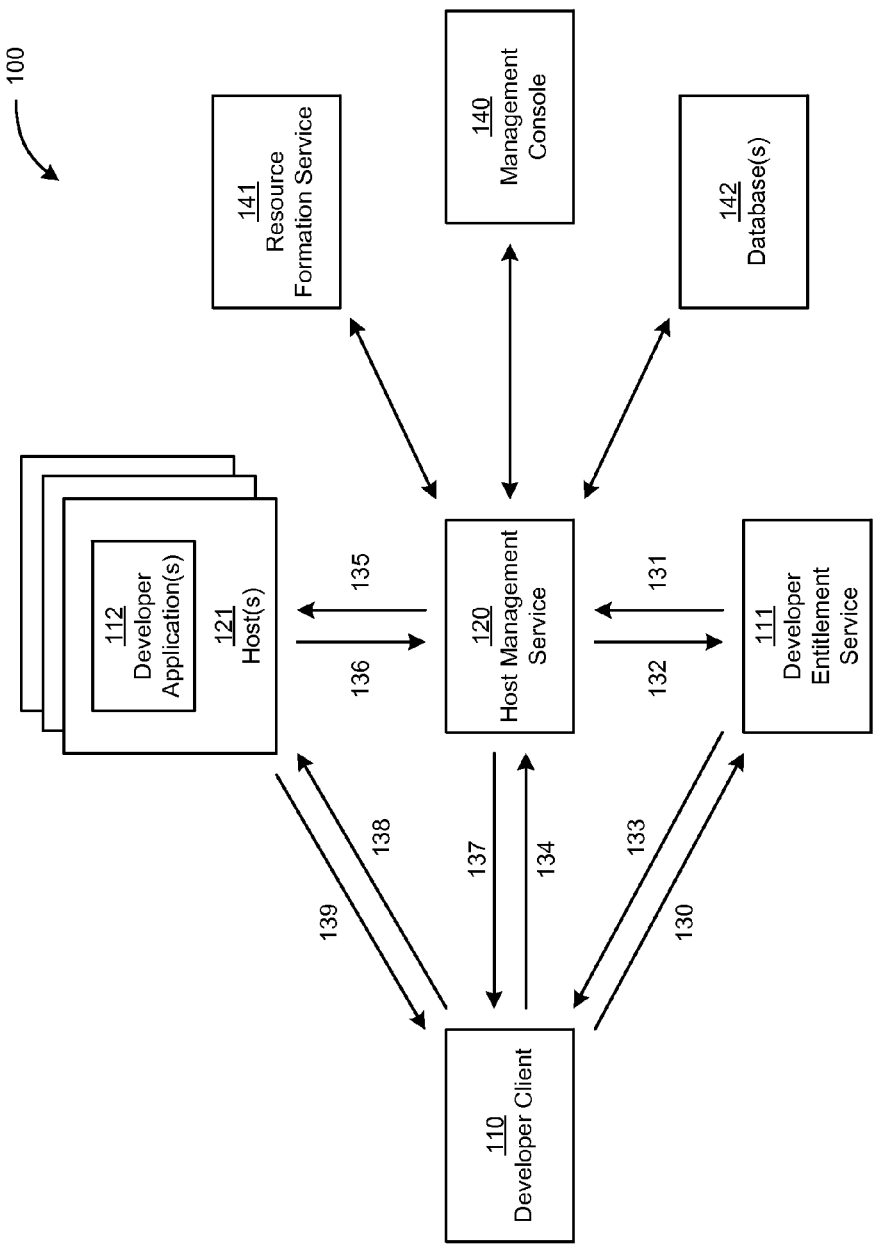
FIG. 1 depicts a system that allows a developer's application to be executed on a host and streamed to a remote computing device.

FIG. 1 depicts a system 100 that allows a developer's application to be executed on a host and streamed to a remote computing device. The system 100 includes a developer client 110. The developer client 110 can be an application operating on a computing device, such as a cell phone, a tablet computer, a laptop computer and the like. The computing device can operate using an operating system, such as WINDOWS, ANDROID, IOS and the like. The developer client 110 can operate within the operating system on the computing device to allow the computing device to interact with a developer application 112 running on a remote host 121. The developer client 110 can sometimes be called a "thin client" in the sense that the developer client 110 has relatively minimal functionality—such as the ability to receive and render video and audio information and the ability to receive and transmit control inputs—compared to the functionality of the developer application 112 running on the remote host 121. As is described in greater detail below, the developer client 110 can be embedded with particular computer instructions, such as predefined software libraries or modules, that permit application content (such as audio and video application content) to be streamed from developer applications 112 and rendered by the developer client 110 on the client computing device, to handle session interaction with the developer applications 112, to encode and decode streamed application content and to receive input controls from a user and transmit the input controls to the developer applications 112. Such embedded computer instructions can be provided to developers of developer client 110 by an operator of the host computing system.

The system 100 may also include a host computing system that includes a host management service 120 and one or more hosts 121. The host management service 120 can manage the one or more hosts 121, one or more developer applications 112 running on the one or more hosts 121, sessions between the one or more developer applications 112 and the developer client 110 and requests from developer client 110 to initiate new sessions with the one or more developer applications 112. Each of the one or more hosts 121 can be a computing device (e.g., a server or desktop computer), an instance operating in a virtualized environment or any other type of environment that can run applications.

The one or more hosts 121 can host developer applications 112 and sessions with client computing devices in a number of different ways. In one example, each of the one or more hosts 121 can run a single developer application 112 in a single session with a client computing device. In another example, each of the one or more hosts 121 can host multiple instances of a single developer application 112, and each of the instances can be run as part of a single session with a client computing device. In another example, one host 121 can run a multi-tenant application that allows for multiple sessions with different computing devices. In yet another example, multiple hosts 121 can run a single application that is either a single-tenant application or a multi-tenant application that permits one or more session with one or more computing devices. The one or more hosts 121 can host developer applications 121 and sessions with client computing devices in any number of other ways.

The system 100 includes one or more developer applications 112. A developer application 112 can include computer instructions provided by the developer of the developer application 112. The computer instructions can include instructions that, when executed, provide particular functions for a computing device. As is described in greater detail below, the developer applications 112 can be embedded with particular computer instructions, such as predefined software libraries or modules, that permit application content (such as audio and video application content) of the developer applications 112 to be captured and streamed to the developer client 110, to handle session interaction with the developer client 110, to encode and decode streamed application content and to receive input controls from the developer client 110. Such embedded computer instructions can be provided to developers of developer applications 112 by an operator of the host computing system.

The system 100 includes a developer entitlement service 111. The developer entitlement service 111 can manage developer client 110 entitlements for access to sessions with developer applications 112. The developer entitlement service 111 can be provided by a developer of the developer client 110 and the developer applications 112. The developer entitlement service 111 could be hosted in the host computing system that includes the host management service 120 and the one or more hosts 121. The developer entitlement service 111 could be hosted and/or provided by a third-party entitlement service.

FIG. 1 also depicts communications that can be used to establish a session between the developer client 110 and a developer application 112. The developer client 110 can send a communication 130 to the developer entitlement service 111. As noted above, the developer entitlement service 111 could be provided by the developer, by the operator of the host computing system or by a third party. The communication 130 can include a request for operation of the developer application 112. The communication 130 can also include authentication information, such as login credentials, a unique identifier and the like, that can be used by the developer entitlement service 111 to authenticate the developer client 110. The developer entitlement service 111 can perform actions, such as checking a status of a user associated with the developer client 110 to ensure that no other active sessions with developer application 112 for that user are present.

If the developer entitlement service 111 decides to allow a session between developer client 110 and developer application 112, the developer entitlement service 111 can send an entitlement request 131 to the host management service 120 to create a session. The entitlement request 131 can be in the form of a call or other request. The host management service 120 can create and store a session identifier and an entitlement token. The host management service 120 can store the session identifier for later use. The entitlement token can be in the form of a particular link, such as a uniform resource locator (URL), that is valid only one time and expires after a particular period of time. The host management service 120 can send a communication 132 back to the developer entitlement service 111 that includes the entitlement token, and the developer entitlement service 111 can send a communication 133 back to the developer client 110 that includes the entitlement token.

Once the developer client 110 has the entitlement token, it can send a request 134 to the host management service 120 to initiate a session with the developer application 112. As will be described in greater detail below, the request 134 can be routed to one of a number of host management services based on a number of factors, such as a determination that host management service 120 is located geographically close to the developer client 110, a determination that the host management service 120 is an optimal host management service 120 for the session and so forth. The host management service 120 can send a communication 135 to provision a host 121 to run the developer application 112. The communication 135 can be in the form of a call to the host 121. The host 121 can send a communication 136 to the host management service 120 with an indication of an internet protocol (IP) address and authentication information of the host 121. The authentication information can include information, such as one or more ports of the host 121 that will be used for the session between the developer client 110 and the developer application 112. The host management service 120 can then send a communication 137 to the developer client 110 that includes an indication of the IP address and the authentication information of the host 121.

After the developer client 110 receives the communication 137 from the host management service 120, the developer client 110 can send a communication 138 to host 121 to initiate direct communication between the developer client 110 and developer application 112. The communication 138 from the developer client 110 to host 121 can be a single data packet sent to one or more ports of the IP address identified in communication 137. The host 121 can identify an IP address and one or more ports of the client computing device from the communication 138, and the host 121 can initiate a stream 139 of application content from developer application 112 to developer client 110.

Figure 2:
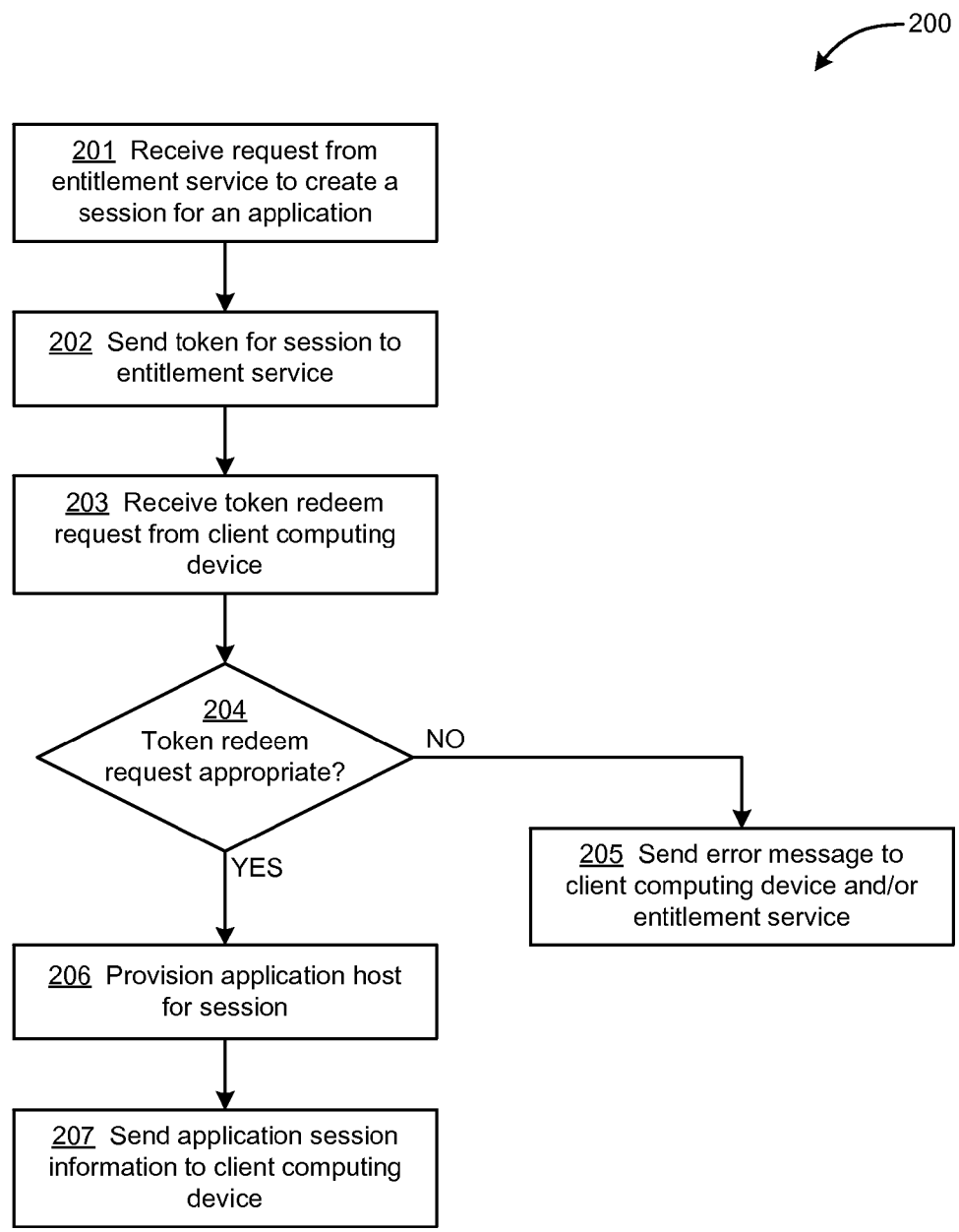
FIG. 2 depicts a method that could be used by a host management service to fulfill a request for initiating a session.

Turning now to FIG. 2, depicted is a method 200 that could be used by a host management service 120 to fulfill a request for initiating a session. At block 201, the host management service can receive a request from an entitlement service to create a session for an application. The request could include an identification of the application to be run. The request may or may not identify the client computing device making the request. The entitlement service may authenticate the client computing device or a user of the client computing device prior to making the request to create the session for an application. At block 202, the host management service can send a token to the entitlement service. The token can be anything used by the requesting client computing device to initiate contact with the host management service. For example, the token can be a particular URL that the client computing device can follow to make contact with the host management service. The entitlement service may pass the token on to the client computing device.

At block 203, the host management service can receive a token redeem request from the client computing device. The token redeem request can be a call to a URL identified by the token. At block 204, the host management service can determine whether the token redeem request is appropriate. This determination can be made based on a time between sending the token to the entitlement service at block 202 and receiving the token redeem request at block 203, based on a authentication information in the token redeem request, based on an IP address of the client computing device and/or based on any other type of information. If, at block 204, it is determined that the token redeem request is not appropriate, then, at block 205, the host management service can send an error message to the client computing device and/or the entitlement service. Such an error message can indicate the reason why the token redeem request was deemed not to be appropriate. However, if, at block 204, is determined that the token redeem request is appropriate, then, at block 206, the host management service can provision an application host for the session. Provisioning the application host can include activating the application host, spinning up an instance in a virtualized environment to be the host, launching the application on an existing application host and/or any other action to provide an application host with the appropriate application. At block 207, the host management service can send an indication of application session information to the client computing device. The application session information can include information that can be used by the client computing device to initiate direct communication with the application host, such as an IP address of the application host, one or more ports associated with the application host and the like.

Referring back to FIG. 1, the host management service 120 can also store information about application sessions for various users. For example, when a session is used by a particular user or by a particular user identifier, the host management service 120 can store information about that session. When the user identifier is used to initiate a subsequent session with the same application, the host management service 120 can identify that information about the prior session has been saved and use that when provisioning a new session. For example, when the developer entitlement service 111 sends the entitlement request 131 to the host management service 120, the developer entitlement service 111 can include an identifier of the user of the client computing device. In response to receiving the identifier of the user of the client computing device, the host management service 120 can locate the stored information about the prior session. When the request 134 is received by the host management service 120 from the developer client 110, the host management service 120 can send the information about the prior session to the host with the communication 135 to provision the host 121. The host 121 can configure the application according to the information about the prior session.

The system 100 can include additional resources to support operation of the host management service 120. The system 100 can include a management console 140. The management console 140 can permit developers to interact with the host computing system to manage any of the developer applications 112 that belong to the developer. For example, a developer can register developer applications that can be hosted by the one or more hosts 121, the developer can indicate resources used to support their developer applications, the developer can request and/or purchase a number and/or a type of hosts 121 that can be used to host the developer's applications and the like. The applications registered with the management console 140 by a developer may need to be properly formatted to render video and audio for streaming to a client computing device, to receive input controls from the client computing device and so forth. Such formatting of the application can be done by a developer using a software development kit (SDK) or other information provided by an operator of the host computing system.

The system 100 can also include a resource formation service 141. Once a developer application is properly registered, the developer application can be installed on a base machine image. A base machine image can include an operating system and virtual software that can be used to create an instance in a virtual machine environment. A snapshot of the base machine image with the installed developer application can be stored in the resource formation service 141. Later, when the host machine service receives a request for a session, provisioning a new host 121 can include the host management service 120 retrieving the snapshot of the base machine image with the installed developer application and create a host 121 that is an instance based on the snapshot. In one embodiment, each of the hosts 121 running a particular developer application can be included in a virtual private cloud for that particular developer application.

To reduce any latency from the perspective of a user of a client computing device, the host management service 120 may provision a number of hosts 121 with a particular developer application. In this way, when the host management service 120 receives a request 134 to redeem a token for a session for the particular developer application, the time it takes for the host management service 120 to respond to the client computing device with the session information (e.g., communication 137) will be less if a host 121 is already running with the developer application than if the host management service 120 must start up a new instance with the particular developer application.

In addition to creating a developer application and registering the developer application with the management console 140, the developer can also create the developer client 110 to properly interact with the developer application on one of the hosts 121. The developer client 110 can be distributed to client computing devices by the developer. With a developer application properly registered with the management console 140 and the developer client 110 distributed to client computing device(s), client computing device(s) are able to establish an application session following the procedure outlined above starting with sending the communication 130 to the developer entitlement service 111.

The system 100 can also include one or more databases 142. The databases 142 can be used to store state information about the developer applications running on the hosts 121. In this way, the hosts 121 themselves can be stateless. While sessions are operating, most of the interactions of the host 121 are directly with the developer client 110. In this way, host management service 120 is not burdened by the load of the data passed between the host 121 and the developer client 110. However, hosts 121 may communicate certain information to the host management service 120. For example, the hosts 121 may send certain messages—such as server event messages, session event messages, heartbeat calls and other messages—to the host management service 120. The hosts 121 can be configured to send such messages on instance start, instance end, session start, session end and once a minute while a session is active. The host management service 120 can record each of these messages in the databases 142.

Heartbeat messages can be sent from a host 121 to the host management service 120 for each active session in the host 121. The heartbeat messages can contain session information of each session. The host management service 120 can write the state information of the heartbeat messages to the databases 142. When a heartbeat message is written to the databases 142, the databases 142 can verify whether the state information is consistent with previously-recorded information about the state of the host 121. If there is any discrepancy, the host management service 120 can determine the actual state of the host 121, and information about the actual state of the host can be written to the databases 142. In this way, regular heartbeats from the hosts 121 can trigger events to ensure that state information written to the databases 142 is current and correct. The heartbeats can be sent from the hosts 121 on a regular basis, such as once per minute.

One advantage to using heartbeat messages is that hosts without any active sessions will not send heartbeat messages to the host management service 120, and the host management service 120 can identify which of the hosts are not sending heartbeat messages. The host management service 120 may maintain a particular number of hosts running a particular developer application that are not currently hosting a session—sometimes called "buffer hosts"—to reduce latency in provisioning hosts after a request for a session from a client computing device. However, if the number of hosts not sending heartbeat messages rises above the number of buffer hosts, the host management service 120 can remove some of the hosts that are not sending heartbeat messages.

The management console 140 can also allow a developer to update a developer application 112 without having to provide updates to all of the client devices. The developer can register a new version of a developer application 112 with the management console 140. A new snapshot of the base machine image with the new version of the installed developer application can be stored in the resource formation service 141. The new snapshot can be used for all new hosts 121. For existing hosts 121 with the older version of the developer application, those hosts 121 can continue operating with the old version until all sessions are closed on one of the hosts 121. Once all sessions on one of the hosts 121 are closed, the host 121 can be removed and a new host with the new version of the developer application can be started. In some cases, the new version of the developer application may be time sensitive, such as an update as a result of a major bug or a security fix. With a time-sensitive update, hosts can be forcibly terminated even if there are open sessions on the hosts. Immediately or soon after terminating the hosts with the old version of the developer application, new hosts with the new version of the developer application can be deployed to replace the terminated hosts. A notice can be sent by the host management service 120 to the hosts 121 that will be forcibly terminated, such that any desired data may be saved prior to the forcible termination.

Figure 3:
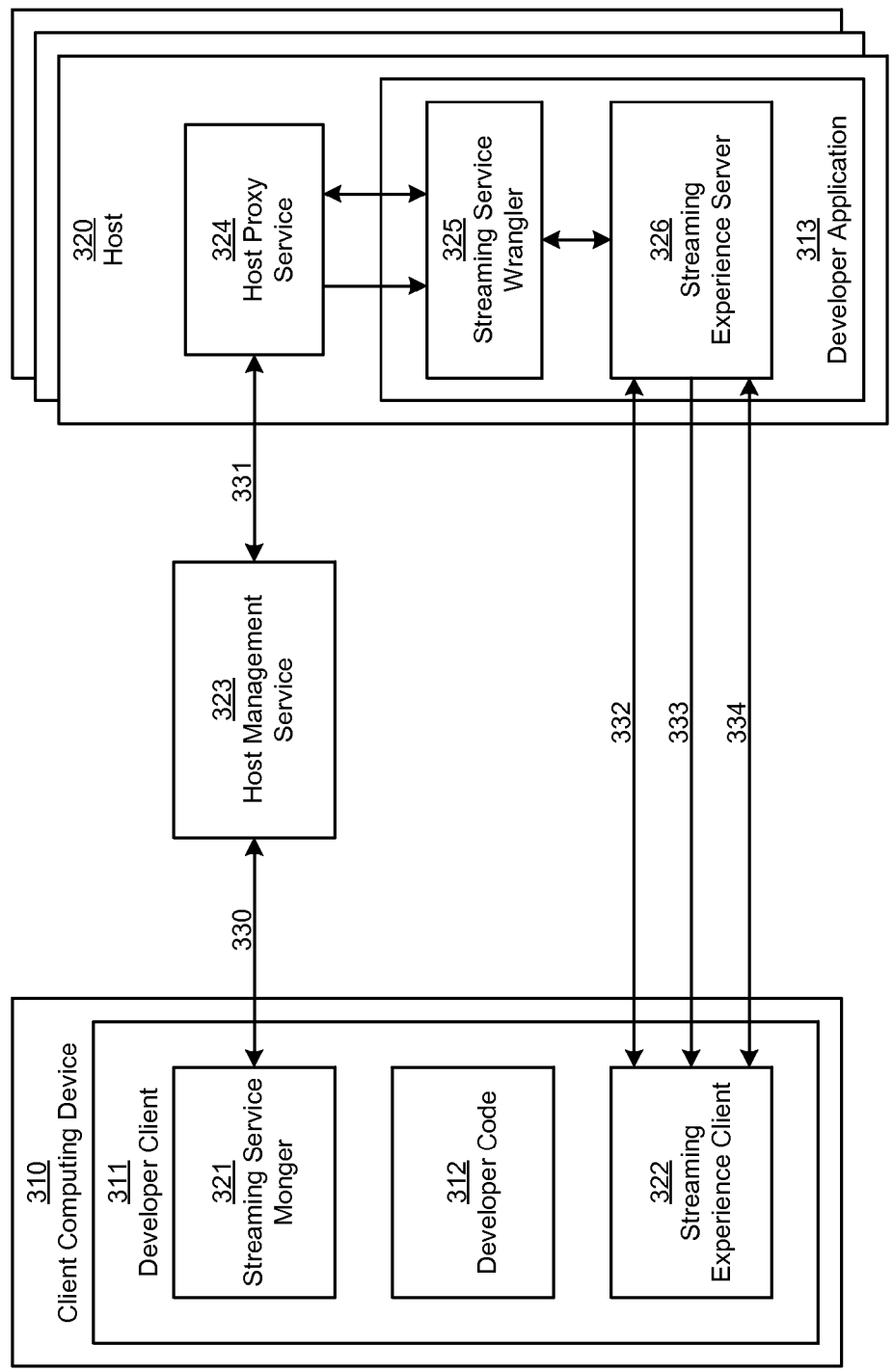
FIG. 3 depicts an example of the communications between a developer client on a client computing device and a developer application on a host.

Referring now to FIG. 3, depicted is an example of the communications between a developer client 311 on a client computing device 310 and a developer application 313 on a host 320. The host 320 is responsible for running the developer application 313, for streaming application content from the developer application 313 to the developer client 311, for accepting control inputs sent from the developer client 311 and for interacting with a host management service 323 to manage sessions and report status.

The developer client 311 can include a streaming service monger 321, developer code 312 and a streaming experience client 322. The streaming service monger 321 can redeem entitlements with the host management service 323 via communications 330. The host management service 323 can determine when to initiate a session for the client computing device 310 with host 320. The host management service 323 can make a call, via communication 331, on a host proxy service 324 of the host 320 to provision a session. If the developer application 313 on the host 320 is not already launched, the host proxy service 324 can launch the developer application 313 on the host 320. The host proxy service 324 can also provision a session and monitor the health of the application and the status of the session. The developer application 313 can include a streaming service wrangler 325 to interface the developer application 313 with the host proxy service 324. Once a session is provisioned, the streaming service wrangler 325 can return session information to the host proxy service 324. The session information can include an IP address of the host 320, session authentication information (e.g., ports to be used to transmit data to and from the developer client 311) and/or a session identifier. The host proxy service 324 can pass the session information back to the host management service 323, which can pass the session information back to the developer client 311. The developer client 311 can use the session information to initiate a streaming connection with the host 320.

The streaming experience client 322 of the developer client 311 can initiate a streaming connection with a streaming experience server 326 library of the developer application 313 on the host 320. The streaming experience client 322 can initiate a control and input connection 332. The control and input connection 332 can be established using a secure protocol, such as a transport layer security (TLS) protocol or a secure sockets layer (SSL) protocol. The streaming experience client 322 can be authenticated by the streaming experience server 326 by the streaming experience client 322 passing information, such as the session authentication information received by the developer client 311, to the streaming experience server 326.

If the streaming experience server 326 authenticates the streaming experience client 322, the streaming experience server 326 can send port information to the streaming experience client 322 via the control and input connection 332. The port information can include one or more ports for establishing one or more streaming connections 333 and one or more ports for establishing one or more streaming control connections 334. The ports can be expressed using a protocol, such as a user datagram protocol (UDP). The streaming experience client 322 can send at least one packet to each of the ports of the one or more streaming connections 333 and the ports of the one or more streaming control connections 334. The streaming experience server 326 can identify the ports from which the streaming experience client 322 sent the at least one packet. At this point, the one or more streaming connections 333 and the one or more streaming control connections 334 will be established because both the streaming experience client 322 and the streaming experience server 326 will know the ports used by the other of the streaming experience client 322 and the streaming experience server 326.

Once the one or more streaming connections 333 and the one or more streaming control connections 334 are established, the one or more streaming connections 333 can be mostly unidirectional from the streaming experience server 326 to the streaming experience client 322. On the other hand, the one or more streaming control connections 334 can be mostly bidirectional between the streaming experience server 326 and the streaming experience client 322. The one or more streaming connections 333 can use a real-time transport protocol (RTP) to stream an audio stream, a video stream, a forward error correction (FEC) stream and a UDP bandwidth test stream. The RTP of the one or more streaming connections 333 can be implemented using standards, such as RFC 3350, RFC 4585 and RFC 6184. RTP packets in the one or more streaming connections 333 can be streamed from streaming experience server 326 to streaming experience client 322 over a UDP transport layer. The one or more streaming control connections 334 can communicate congestion and quality of service (QoS) information is transmitted between the streaming experience server 326 and the streaming experience client 322 using an RTP control protocol (RTCP). The RTCP packets in the one or more streaming control connections 334 can be streamed over a UDP transport layer. Additional QoS information can be transmitted reliably over the control and input connection 332, along with remote procedure call (RPC) messages and control inputs.

In one embodiment, the streaming connections 333 include four streaming connections: one streaming connection for each of an audio stream, a video stream, an FEC stream and a UDP bandwidth test stream. The UDP bandwidth test stream can test the stream at the start of a session to provide an estimate for an initial video bit-rate. In the same embodiment, the one or more streaming control connections 334 include four streaming control connections: one streaming control connection for each of the audio stream, the video stream, the FEC stream and the UDP bandwidth test stream. The four streaming control connections 334 can be used for transmitting corresponding control information in both directions.

Streaming RTP packets over a UDP transport layer provide real-time or near-real-time delivery of packets at the expense of packet losses. One mechanism for recovering lost packets is the use of FEC. FEC encodes source symbols and generates redundant parity bits. Both the encoded source symbols and parity bits are transmitted to the client. In the event of packet losses below a certain threshold, the client regenerates the source symbols without retransmission. In one embodiment, Didier Reed Solomon implementation of FEC can be used for protecting audio and video streams. In another embodiment, symbol size can be defined as a maximum transmission unit (MTU) size and an FEC block as the number of packets for a single video frame. If an audio packet is approximately 200 bytes in size, the audio packet can be padded to an MTU size for FEC encoding. Such an embodiment can protect audio and video streams in multiplexed source blocks.

Figure 4:
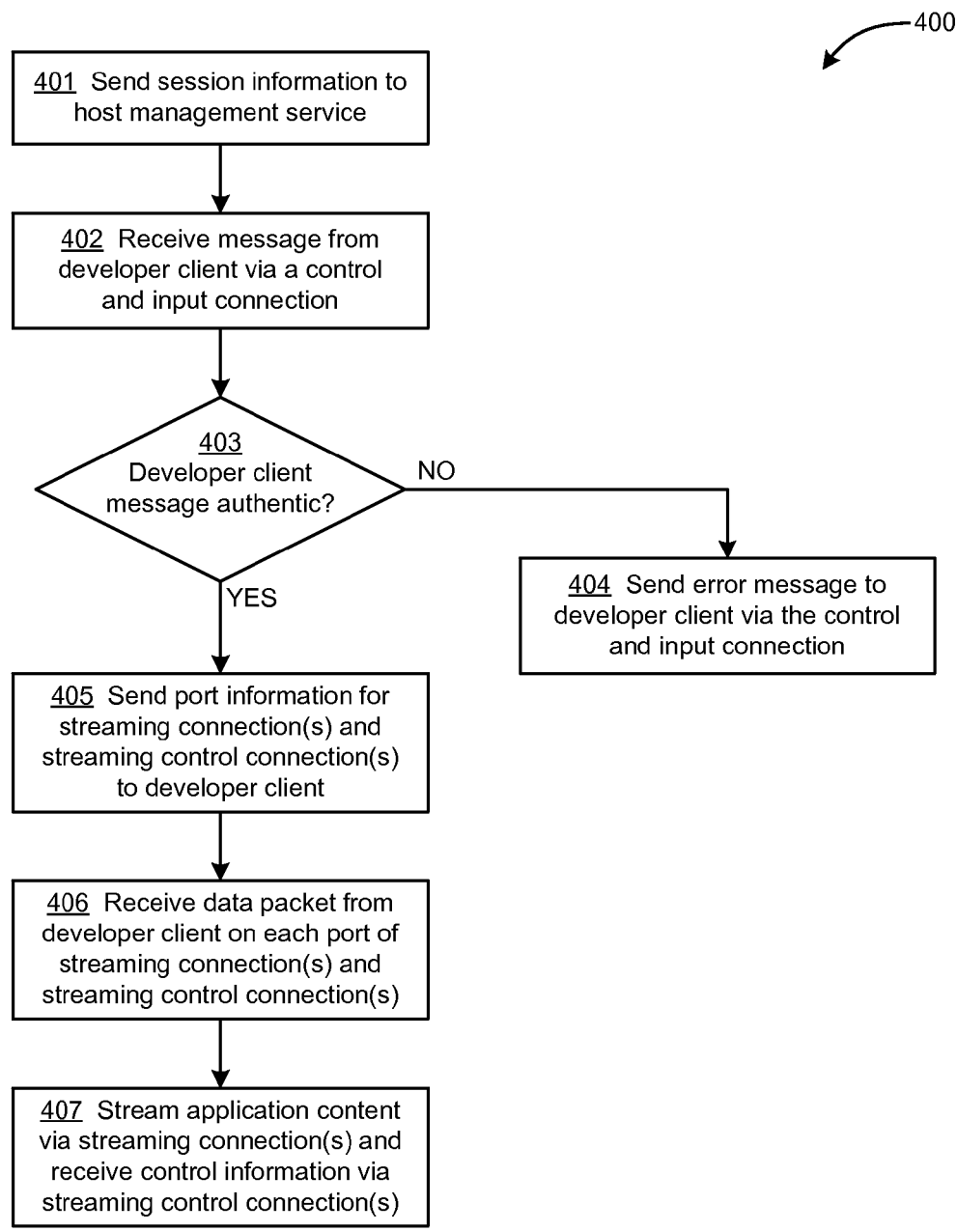
FIG. 4 depicts a method that can be used by a developer application to establish direct communication links with a developer client.

Referring now to FIG. 4, depicted is a method 400 that can be used by a developer application to establish direct communication links with a developer client. At block 401, the developer application can send session information to a host management service. The host management service can pass the session information to the developer client. The session information can include an IP address of the host and a port to be used by the developer application for a control and input connection. The session information can also include authentication session information that can be used to authenticate the developer client. At block 402, the developer application can receive a message from the developer client at the port to be used by the developer application for a control and input connection. The message can include a single data packet. The message can also include authentication information, such as the authentication session information.

At block 403, the developer application can determine whether the developer application message is authentic. The determination can be made based at least in part on the content of the message. In one embodiment, the determination can be made by comparing the authentication session information received in the message to the authentication session information sent in block 401. If, at block 403, it is determined that the developer application message is not authentic, then, at block 404, the developer application can send an error message to the developer client indicating an error with the message. However, if, at block 403, it is determined that the developer application message is not authentic, then, at block 405, the developer application can send port information for one or more streaming connections and one or more streaming control connections to the developer client.

At block 406, the developer application can receive a data packet from the developer client on each port of the one or more streaming connections and the one or more streaming control connections. The developer application can determine a port used by the developer client to send each of the data packets. At block 407, the developer application can stream application content to the developer client via the one or more streaming connections, and the developer application can send and receive control information via the one or more streaming control connections.

Figure 5A:
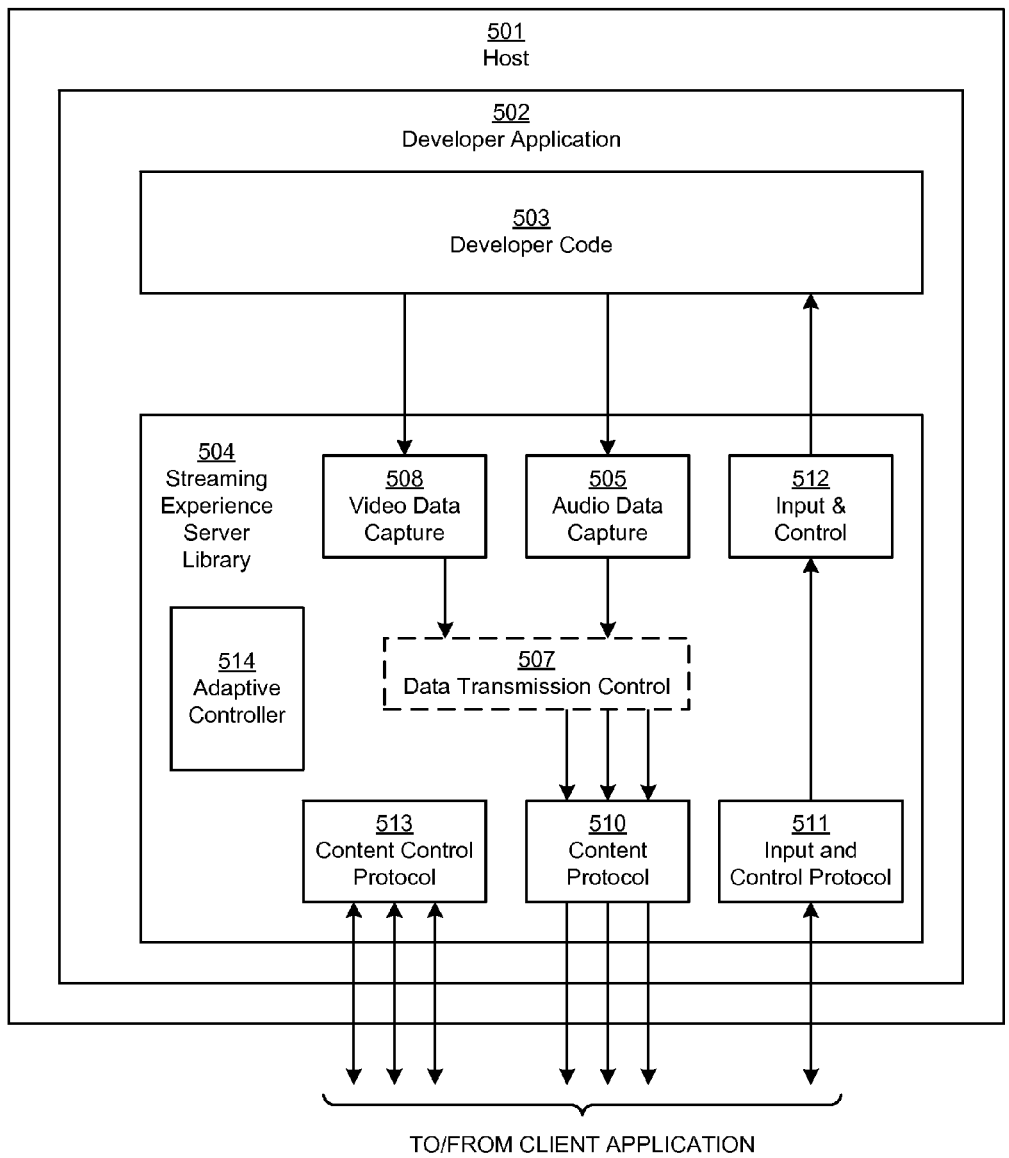
FIGS. 5A and 5B depict an embodiment of a developer application running on a host.
Figure 5B:
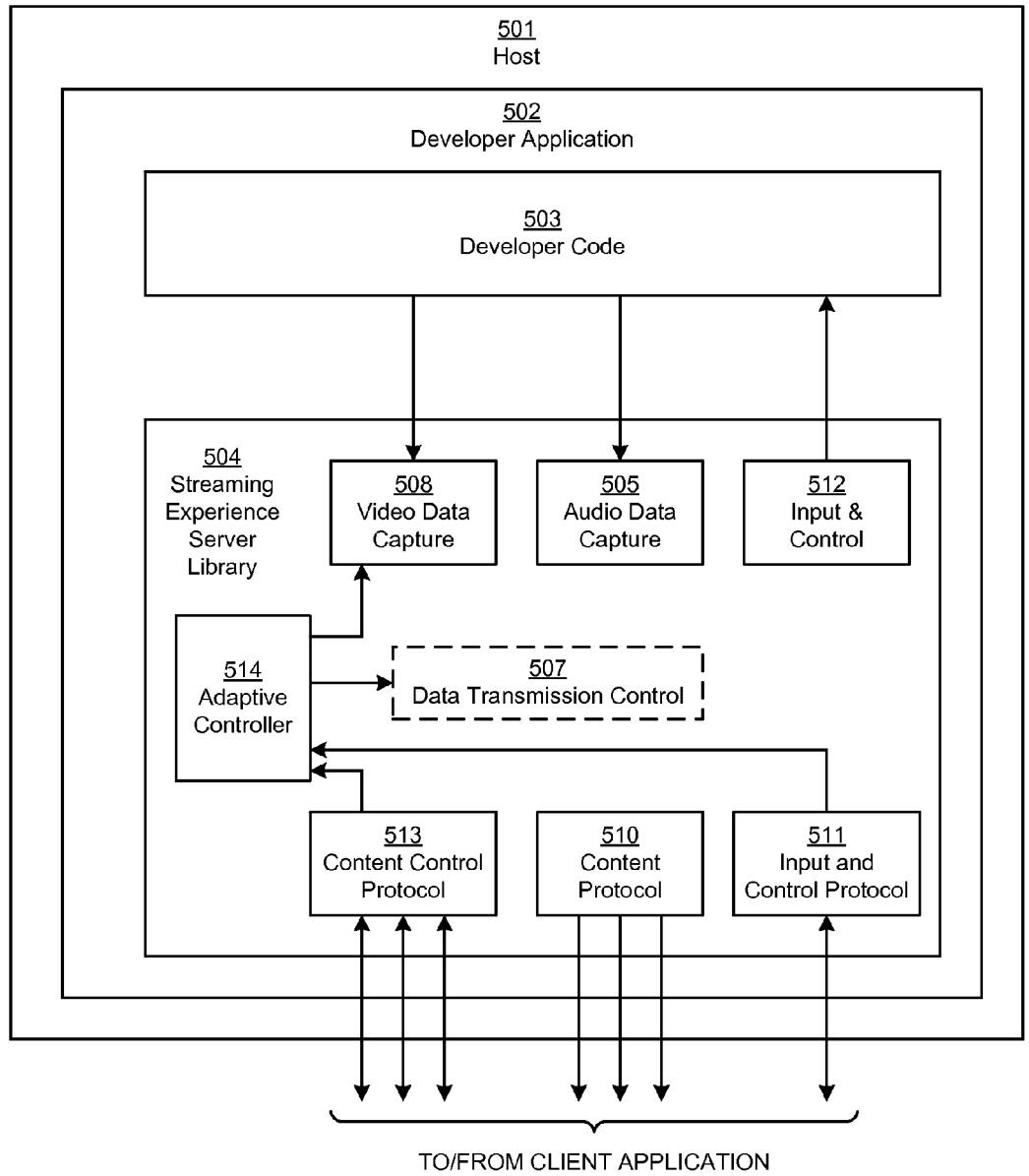

FIGS. 5A and 5B depict an embodiment of a developer application 502 running on a host 501. FIG. 5A depicts an example of how the developer application 502 can stream application content, such as audio, video, FEC and input streams. The developer application 502 includes developer code 503. The developer code 503 can include computer instructions that provide the functionality of the developer application 502. The developer application 502 also includes a streaming experience server library 504 that include components, which allow interaction with a remote client application.

The developer code 503 generates an audio stream that is fed to an audio data capture component 505. The audio data can include information that can be used to render audio associated with the application on a client computing device. The audio data can include an audio stream that can be encoded. In one embodiment, the audio data capture component 505 can include an audio encoder. The audio data capture component 505 does not need to have an encoder as it may be possible for a client computing device to encode some or all of the audio data for rendering on the client computing device. The audio data can be passed to a data transmission control unit 507, such as an FEC codec or other channel coding or error-correction coding. In an ideal case, such as in the case of perfect network conditions, the data transmission control unit 507 would be optional (as indicated by the dashed lines) and data. The developer code 503 can also generate video data that can be fed to a video data capture component 508. The video data can include information that can be used to render video associated with the application on a client computing device. The video data can include a video stream that can be encoded by a video encoder. In one embodiment, the video data capture component 508 can include a video encoder, such as an X264 encoder. The video data capture component 508 does not need to have an encoder as it may be possible for a client computing device to encode some or all of the video data for rendering on the client computing device. The video data can be passed from the video data capture component 508 to the data transmission control unit 507. The data transmission control unit 507 can generate three streams—one for each of the audio stream, the video stream and an FEC stream (or other channel coding or error-correction coding). The three streams generated by the data transmission control unit 507 can be passed to content protocol component 510. The content protocol component 510 can place the three streams generated by the data transmission control unit 507 into data packets, such as RTP data packets, and transmit the data packets to the client application, such as over a UDP transport layer.

The developer application 502 can also include a content control protocol component 513. The content control protocol component 513 can generate synchronization information, such as presentation timestamps, for each of the content streams. The content control protocol component 513 can place the synchronization information in data packets, such as RTCP packets and transmit the data packets to the client application, such as over a UDP transport layer. The developer application 502 can also include an input and control protocol component 511 that can receive input and control data packets transmitted from the client application over a channel, such as in TCP data packets over a TCP channel, and remove the input and control data from the packets. The input and control data can be sent to an input and control interface 512, which passes the input and control data to the developer code 503.

The developer application 502 can also include an adaptive streaming controller 514. As shown in FIG. 5B, the adaptive streaming controller 514 can receive inputs from the input and control component 511 and content control protocol component 513. The inputs to the adaptive streaming controller 514 from the input and control component 511 can include the input and control data sent by the client application. The inputs to the adaptive streaming controller 514 from the content control protocol component 513 can include information about dropped packets, packet jitter, error rates, throughput rates and other QoS information. The adaptive streaming controller 514 can take all of the inputs into account to monitor real-time network conditions. The adaptive streaming controller 514 can send control signals to the video data capture component 508 and the data transmission control unit 507 to control video bitrates and error correction rates. In one embodiment, the adaptive streaming controller 514 can implement a mathematical algorithm that takes the inputs into account and outputs the desired video bit-rate and FEC rate for a given bandwidth margin. Controlling the video bit-rate can control the quality of the subsequent video frames and minimize the possibility for disruption of the video stream to the client application.

A video encoder in video data capture component 508 can include a number of capabilities that can balance the quality of the video with the available bandwidth. Such a balance can compensate for poor network conditions to provide the client application with an appropriate video stream given the network conditions. The video encoder capabilities can be dynamically changed based on changing network conditions, such as in response to receiving a control signal from the adaptive streaming controller 514. In one embodiment, the video encoder can implement one or more of the following techniques: I-frame requests, slice-based encoding, gradual decoder reset (GDR) sweeps, long term reference frames, frame rate changes and/or resolution changes.

Figure 6:
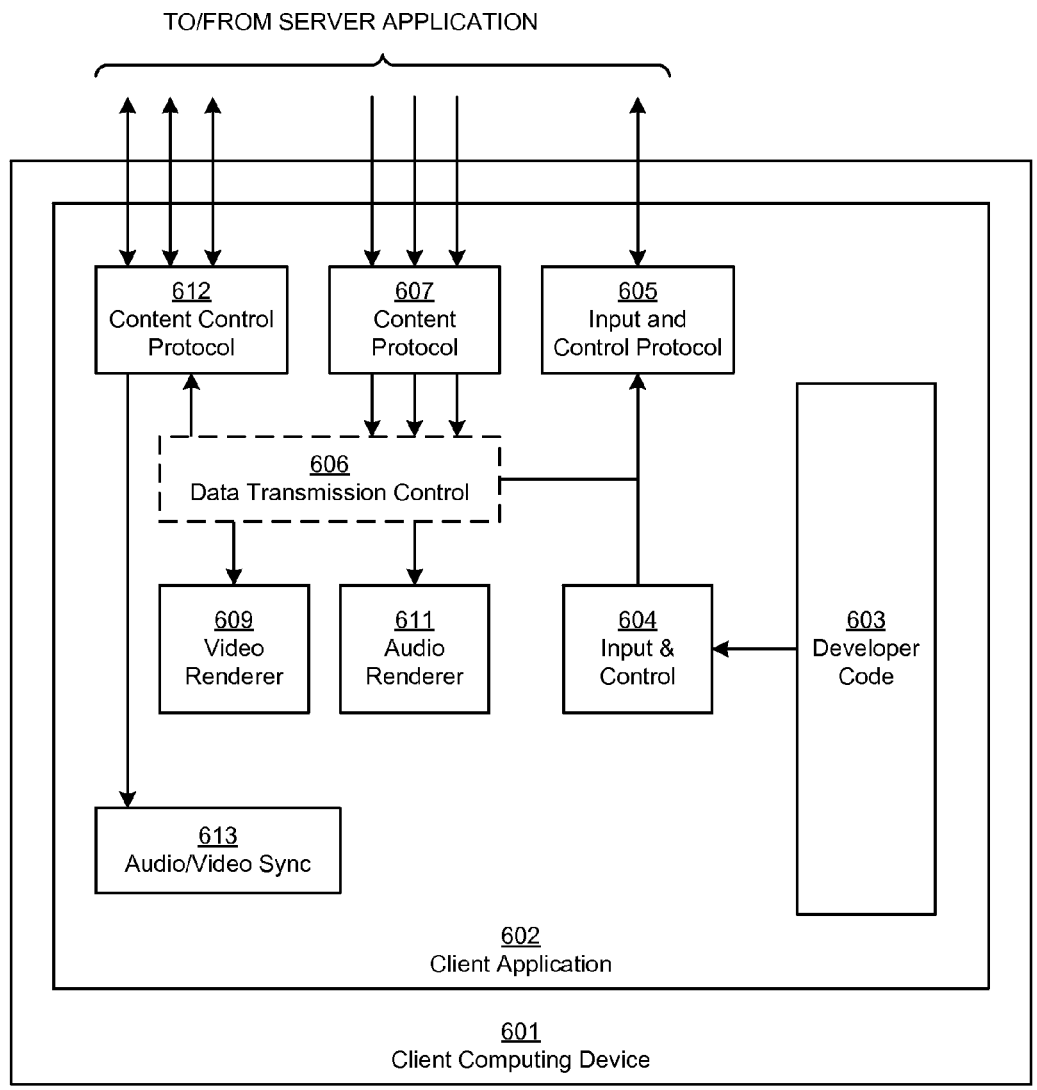
FIG. 6 depicts an embodiment of a client application on a client computing device.

FIG. 6 depicts an embodiment of a client application 602 on a client computing device 601. The client application 602 can include developer code 603. The client computing device 601 can receive user inputs, and the developer code 603 can capture those user inputs. The input and control element 604 can generate input and control information based on the captured user inputs. The input and control information can be passed to an input and control protocol component 605. The input and control protocol component 605 can also receive control information from a data transmission control unit 606, such as an FEC codec. The input and control protocol component 605 can place the input and control information into packets, such as TCP packets, and transmit the packets to a developer application over a channel, such as a TCP channel.

The client application can also include a content protocol packet receiver 607, such as an RTP packet receiver. The content control protocol can receive content streams, such as video, audio and FEC streams in packets and extracts the data from the content stream packets. The data from the content streams is passed to the data transmission control unit 606. The data transmission control unit 606 can address any transmission loss issues that are correctable using an error correction protocol. Video data can be passed from the data transmission control unit 606 to a video renderer 609. The video renderer 609 can include a video decoder that can decode encoded video data. The video renderer 609 can render the video on the client computing device 601. In one embodiment, the video rendered 609 can include a video decoder, such as an H.264 video decoder. Audio data can be passed from the data transmission control unit 606 to an audio renderer 611. The audio renderer 611 can include an audio decoder that can decode encoded audio data. The audio renderer 611 can render the audio on the client computing device 601. In one embodiment, the audio renderer 611 can include an audio decoder.

The data transmission control unit 606 can also pass feedback information to a content control protocol component 612. The feedback information can include information about dropped packets, packet jitter, error rates, throughout rates and other QoS information. The content control protocol component 612 can send the feedback information to the server application as packets, such as RTCP packets, over a transport layer, such as a UDP transport layer. The content control protocol component 612 can also receive synchronization information, such as presentation timestamps, for each of the audio, video and FEC streams. The content control protocol component 612 can pass the synchronization information to an audio/video synchronization controller 613 that can ensure that the video rendered by the video renderer 609 and the audio rendered by the audio renderer 611 are in sync or close to in sync.

Figure 7A:
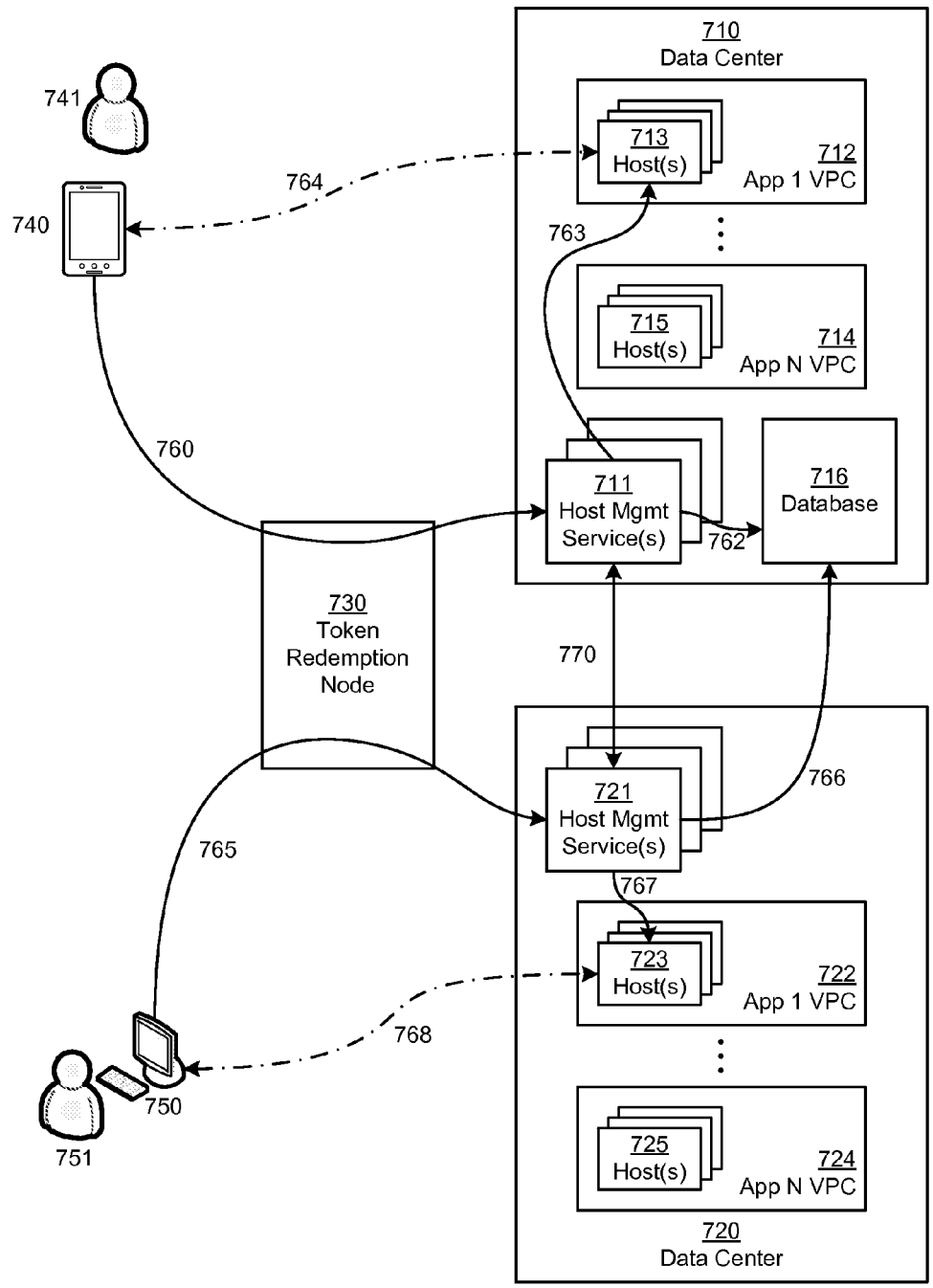
FIGS. 7A and 7B depict examples of routing redeem request from client computing devices to host management services and establishing a session between the client computing devices an appropriate host.
Figure 7B:
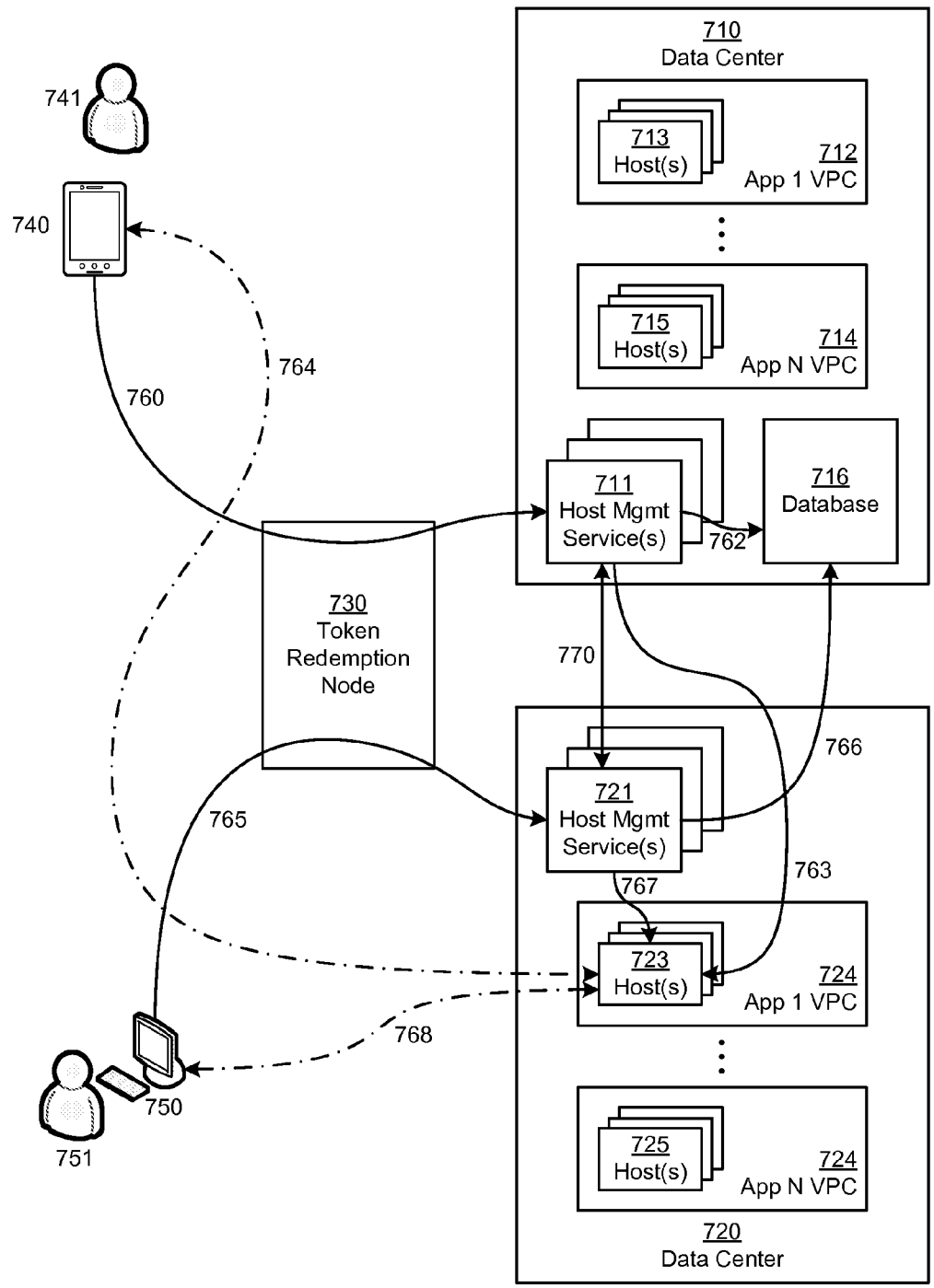

FIGS. 7A and 7B depict examples of routing redeem request from client computing devices to host management services and establishing a session between the client computing devices an appropriate host. The depiction in FIGS. 7A and 7B show a first data center 710, a second data center 720, a token redemption node 730, a first client computing device 740 and a second client computing device 750. The first data center 710 includes host management services 711, virtual private clouds (VPCs) 712 and 714 for each of the applications hosted in the first data center 710. VPC 712 includes hosts 713 that run a first application, and VPC 714 includes hosts 715 that run an nth application. Any number of other VPCs could be included in the data center 710, and any number of hosts running different applications could be included in the first data center 710. The data center 710 also includes a database 716.

The second data center 720 includes host management services 721 and VPCs 722 and 724 for each of the applications hosted in the second data center 720. VPC 722 includes hosts 723 that run the first application. The VPC 722 can be part of the same VPC as VPC 712 as each of VPC 722 and VPC 712 are running the same first application. VPC 724 includes hosts 725 that run an nth application. The VPC 724 can be part of the same VPC as VPC 714 as each of VPC 724 and VPC 714 are running the same nth application. Any number of other VPCs could be included in the second data center 720, and any number of hosts running different applications could be included in the data center 710. Any number of other data centers may be used beyond the first and second data centers 710 and 720 depicted in FIGS. 7A and 7B.

The depiction in FIGS. 7A and 7B also shows a token redemption node 730. The token redemption node 730 can receive token redemption requests from client computing devices. The token redemption node 730 can verify an authenticity of tokens sent by the client computing devices and route token redemption requests to a host management service in a particular data center. The depiction in FIGS. 7A and 7B also shows two client computing devices: a first client computing device 740 used by a first user 741 and a second client computing device 750 used by a second user 751. The first and second computing devices 740 and 750 can be located in different geographic locations, such as the west coast of the United States and the east coast of the United States, respectively. The first and second data centers 710 and 720 can also be located in different geographic locations, such as in San Francisco and Washington, D.C., respectively.

FIGS. 7A and 7B show two examples of how token redemption requests can be handled. In the example depicted in FIG. 7A, the first computing device 740 sends a token redemption request 760 to the token redemption node 730. The token redemption node 730 can identify one of the available host management services with the nearest IP address to the IP address of the first computing device 740. The IP of the first computing device 740 could have been provided to the token redemption node 730 by a developer entitlement service (not shown) when the first computing device 740 requested that the developer entitlement service initiate a session. In the case in FIG. 7A, the token redemption node 730 routes the token redemption request 760 to the host management service 711 in the first data center 710 on the basis that the first computing device 740 is closer geographically to the first data center 710 than to the second data center 720. The host management service 711 can get 762 any state information for a session of the first application from the database 716 and provision 763 a session in host 713. Once session information is sent back to the first computing device 740, the first computing device 740 and the host 713 can establish a direct connection 764 to stream application content (e.g., video and audio streams) from the host 713 to the first computing device 740 and to pass input and control information from the first computing device 740 to the host 713.

As is also depicted in the example in FIG. 7A, the second computing device 750 sends a token redemption request 765 to the token redemption node 730. The token redemption node 730 can identify one of the available host management services with the nearest IP address to the IP address of the second computing device 750. The IP of the second computing device 750 could have been provided to the token redemption node 730 by a developer entitlement service (not shown) when the second computing device 750 requested that the developer entitlement service initiate a session. The token redemption node 730 can identify one of the available host management services that is geographically closer to the client computing device based on a latency of communications between the client computing device and the available host management services. In the case in FIG. 7A, the token redemption service 730 routes the token redemption request 765 to the host management service 721 in the second data center 720 on the basis that the second computing device 750 is closer geographically to the second data center 720 than to the first data center 710. The host management service 711 can get 766 any state information for a session of the first application from the database 716 and provision 767 a session in host 723. In this example, the host management service 721 in the second data center 710 obtains data from the database 716 in the first data center 710. It may be advantageous to store all information about sessions related to a single application in a single database 716. The amount of communication between the host management service 721 and the database 716 may be sufficiently low that there is little to no effect on latency of provisioning sessions. Conversely, it is also possible to have databases in each of the first and second data centers 710 and 720. Once session information is sent back to the second computing device 750, the second computing device 750 and the host 723 can establish a direct connection 768 to stream application content (e.g., video and audio streams) from the host 723 to the second computing device 750 and to pass input and control information from the second computing device 750 to the host 723.

The host management service 711 and host management service 721 can send communications 770 to each other to share information. The host management service 711 and host management service 721 can share information about active sessions hosted in their respective data centers 710 and 720. The host management service 711 and host management service 721 can share information about availability and/or capacity in their respective data centers 710 and 720. The host management service 711 and host management service 721 can also share any other information. The information communicated between the host management service 711 and host management service 721 can be used when one of the host management service 711 and host management service 721 determines to provision a session with a host in one of the data centers 710 and 720.

In FIG. 7B, the interactions between the second computing device 750, the token redemption node 730, the host management service 721 and the host 723 are the same as in FIG. 7A. In other words, the second computing device 750 sends the token redemption request 765 to the token redemption node 730. The token redemption node 730 routes the token redemption request 765 to the host management service 721. The host management service 721 provisions 767 a session with host 723 and a direct connection 768 between the second computing device 750 and the host 723 is established.

In the example shown in FIG. 7B, the first computing device 740 sends a token redemption request 760 to the token redemption node 730. The token redemption service 730 routes the token redemption request 760 to the host management service 711 in the first data center 710 on the basis that the first computing device 740 is closer geographically to the first data center 710 than to the second data center 720. In this particular instance, the host management service 711 in the first data center 710 provisions 763 a session with host 723 in the second data center 720. A direct connection 764 between the first computing device 740 and the host 723 is established.

The decision by the host management service 711 to provision 763 a session with host 723 in the second data center 720—despite the first computing device 740 being closer geographically to the first data center 710 than to the second data center 720—may be based on one or more of a number of factors. In one example, the first computing device 740 and the second computing device 750 may need to establish sessions with the same multi-tenant application operating in the same host. The host management service 711 can determine that an active session is already in place between the host 723 and the second computing device 750, and then provision an additional session between the host 723 and the first computing device 740. In another example, the host management service 711 can determine that a session with the first computing device 740 and a session with the second computing device 750 will frequently communicate with each other. Provisioning the sessions with the first computing device 740 and the second computing device 750 in the same data center may reduce latency in communications between the sessions and overcome any latency issues with the direct connection 764 between the first computing device 740 and the host 723 spanning a long geographic distance. In yet another example, host management service 711 can determine that computing efficiencies in host 723 may overcome any latency issues with the direct connection 764 between the first computing device 740 and the host 723 spanning a long geographic distance. Many other reasons for the decision by the host management service 711 to provision 763 a session with host 723 in the second data center 720 are possible.

Figure 8:
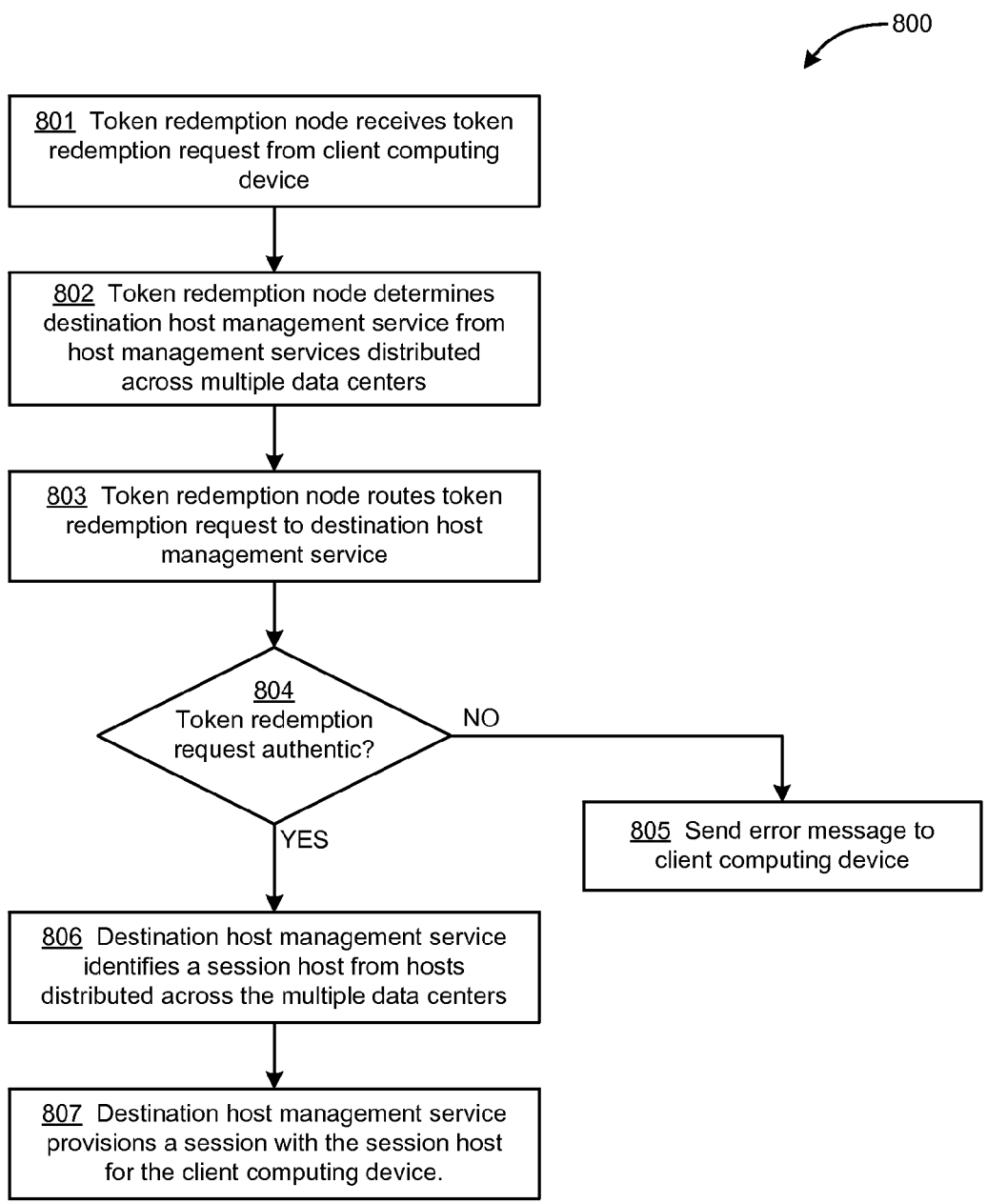
FIG. 8 depicts a method that can be used by a token redemption node and host management services in multiple data centers to route token redemption requests.

FIG. 8 depicts a method 800 that can be used by a token redemption node and host management services in multiple data centers to route token redemption requests. At block 801, the token redemption node can receive a token redemption request from a client computing device. The token redemption request can include a token that was generated by one of the host management services, sent to a developer entitlement service and then sent to the client computing device. At block 802, the token redemption node can determine a destination host management service from among the host management services distributed across the multiple data centers. The determination of the destination host management service can be based on a geographic distance between the data center in which the destination host management service is located and the client computing device. The determination of the destination host management service can also be based on a comparison of an IP address of the client computing device and an IP address of the host management service. At block 803, the token redemption node can route the token redemption request to the destination host management service.

At block 804, the destination host management service can determine whether the token redemption request is authentic. Such a determination can be based on the token redemption request being received within a particular time period, based on an identity of the client computing device that sent the token redemption request or based on any other type of information. If, at block 804, it is determined that the token redemption request is not authentic, then, at block 805, an error message can be sent to the client computing device. However, if, at block 804, it is determined that the token redemption request is authentic, then, at block 806, the destination host management service can identify a session host from among hosts distributed across the multiple data centers. The determination of a session host can be based on a geographic location of the data center in which the session host is located with respect to the client computing device, based on the existence of one or more other sessions in the data center in which the session host is located, based on computing efficiencies of the session host, based on latency of communications between a data center and the client computing device or based on any other type of information. At block 807, the destination host management service can provision a session with the session host for the client computing device. Provisioning the session with the session host can include sending session information to the client computing device so that the client computing device can initiate a direct connection with the session host.

Referring back to FIG. 7A, the depiction illustrates some of the benefits of the embodiments described herein. One possible benefit is the scalability of number of hosts available for running applications and hosting developer applications. For example, the first and second data centers 710 and 720 can spin up instances of hosts as additional hosts are needed. In addition, if the first and second data centers 710 and 720 are reaching a capacity of the number of active hosts, additional data centers can be employed without adding significant additional burden on the first and second data centers 710 and 720. Because the sessions operating on the hosts are stateless, the adding of new hosts (whether within an existing data center or adding a new data center) should scale network demands nearly linearly.

Another possible benefit is the availability of the system components. Since the hosts are stateless, additional data centers and/or hosts can be added in multiple regions. Adding data centers in multiple regions can reduce latency between hosts and users in those regions. If the database 716 is located in only one location, there is a possibility that network conditions in that one location could affect the availability of all the hosts. However, it is possible to relocate the database 716 if needed or to distribute the database 716 across multiple locations.

Another possible benefit is the potential of recovery from loss of hosts and/or data centers. Because the sessions between hosts and client computing devices are stateless, the loss of a data center or individual hosts will not prevent the system from operating. For example, if the second data center 720 was located in a location that suffered a natural disaster that destroyed the second data center 720, the second computing device 750 could re-establish a session for the same application by sending a new session request and having a new session established with a host in the first data center 710. Because all of the state information for the use of the application by the user 751 is stored in the database 716, the new session established with a host in the first data center 710 will contain the same state information as the previous session with data center 720. If the database 716 is located in a single data center, such as the first data center 710, the single location of the database 716 could create a single point of failure. However, a copy of the database 716 could be stored in another location, such as in data center 720, on a regular basis so that data loss stemming from loss of the database 716 would be limited to the data stored in the database 716 in the time since the last backup.

Another possible benefit is the performance gained by separating the application content connections from the management connection. As is shown in FIG. 7A, the direct connections 764 and 768 between the first and second computing devices 740 and 750 and the hosts 713 and 723, respectively, do not burden the host management services 711 and 721 in any way. This allows the host management services 711 and 721 to perform management functions—such as responding to request for tokens, provisioning hosts, storing session information from heartbeat signals and the like—without also have to handle the session streams. In this way, the host management services 711 and 721 can handle entitlement and token redemption requests in as little time as possible. This will reduce any perceived latency to a user following a request to use an application.

Another possible benefit is the security risk of an application code being transferred from client computing devices to host computing devices. Developer applications can be malicious or have security flaws that allow the applications to become malicious. Client computing devices may not be as well equipped to handle such issues as host computing devices; host computing devices may be more capable of identifying and neutralizing malicious code or behavior. The host system can also incorporate a number of security functions. In one example, applications from one developer can be hosted within a single virtual private cloud to limit access of the developer's application(s) to other applications. In another example, an operator of the hosts can deliver credentials to sign interaction from the host. In another example, none of the hosts stores any information about the client computing device or a user of the client computing device.

Figure 9:
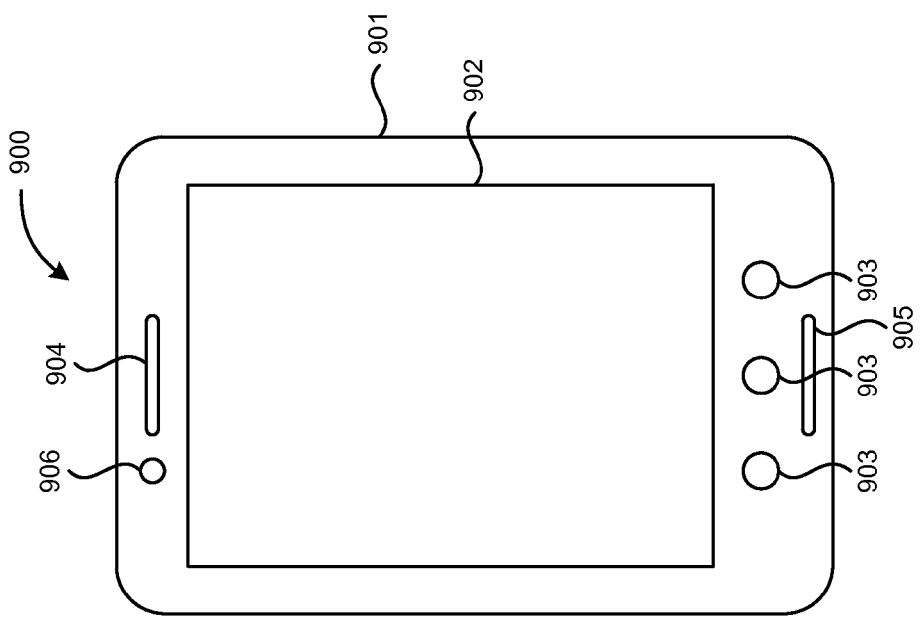
FIG. 9 depicts an embodiment of external components of a computing device.

FIG. 9 depicts an embodiment of external components of a computing device 900. It should be understood that this is merely an example for discussion, and that a number of additional components, configurations, assemblies and combinations are possible as known in the art. Computing device 900 can be any form of a computer, such as a desktop computer or laptop computer, a tablet computing device, a cell phone, a handheld computing device or any other form of computing device. Computing device 900 can include a housing 901. The housing 901 can be made of any material or combinations of materials, such as various types of plastic, metal, glass and combinations thereof, that is suitable to house the components of computing device 900. Computing device 900 can also include a display 902 that can display images, text, any other type of visual information, and any combination thereof. Display 902 can also be a touchscreen display that is capable of sensing the presence and location of one or more touches of the display 902. A touchscreen display can sense touches by a user, such as a touch by a finger or a hand, and touches by objects, such as a stylus. Display 902 can be part of a user interaction system of the computing device 900.

Computing device 900 can also include one or more hard buttons 903 integrated into housing 901. In one embodiment, the one or more hard buttons 903 can include a single button, such as a home button or a power button. In another embodiment, the one or more hard buttons 903 can include a small set of buttons, such as a power button, a home button and a back button. In yet another embodiment, the one or more hard buttons 903 can include a large set of buttons, such as a full QWERTY keyboard, a keypad and the like. The one or more hard buttons 903 can be part of the user interaction system of the computing device 900.

Computing device 900 can also include a speaker 904 configured to emit sounds and a microphone 905 configured to receive sounds. In the embodiment where computing device 900 is a cell phone, speaker 904 and microphone 905 can be used to carry on a telephone call. In one embodiment, speaker 904 can be configured to play sounds associated with graphics displayed on display 902, such as during play of audiovisual material on computing device 900. In another embodiment, microphone 905 can receive audio sounds, which the computing device 900 can interpret as user inputs. In addition, while not depicted in FIG. 9, computing device 900 can also include an audio port, which can be connected to an external microphone and/or an external speaker or speakers. Computing device 900 can send and receive audio signals via the audio port and interpret the received audio signals via the audio port just as it would interpret audio signals generated from sounds received by the microphone 905.

Computing device 900 can also include one or more optical devices 906. In one embodiment, an optical device can include an optical sensor, such as an infrared sensor, a visible light sensor and/or any device that can sense light and/or electromagnetic energy. The detection of light and/or electromagnetic energy can be used by the computing device 900 to control components of the computing device 900, such as a level of light emitted by a backlight of display 902, illumination of one or more hard buttons 903 and any other aspect of computing device 900. In another embodiment, an optical device can include an image-capturing device, such as a digital camera. An image-capturing device can include any device configured to capture an image, such as a complementary metal-oxide-semiconductor (CMOS) active pixel sensor (APS) and a charged coupled device (CCD). Images captured by one or more optical devices 906 can be stored by the computing device 900 as individual image or as a series of images in a video. Individual images and/or video images can be processed by computing device 900 and interpreted as user inputs. While FIG. 9 depicts one of the optical devices 906 pointing in the same direction as the display 902, it is possible for computing device 900 to have any number of optical devices 906, and it is possible for one or more optical devices 906 to be pointed in other directions, such as a rear-facing camera pointing in the opposite direction of display 902.

Figure 10:
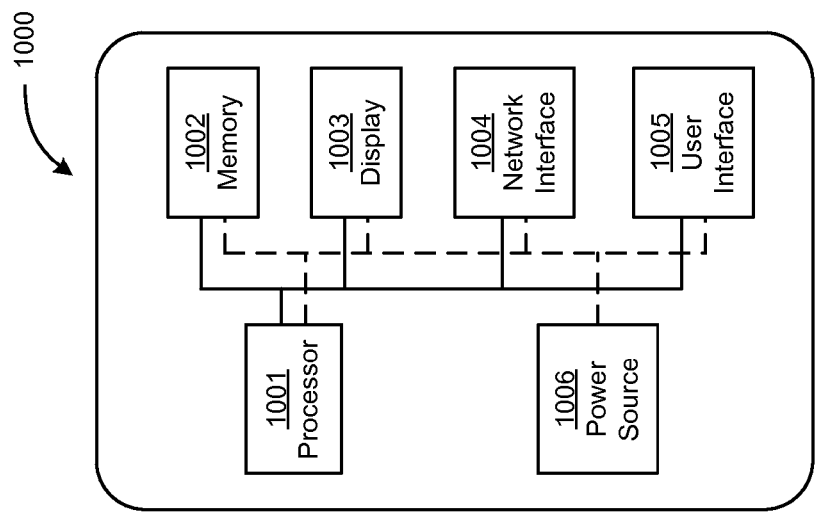
FIG. 10 depicts an embodiment of internal components of a computing device.

FIG. 10 depicts an embodiment of internal components of a computing device 1000. It should be understood that this is merely an example for discussion and that a number of additional components, configurations, assemblies and combinations are possible as known in the art. Computing device 1000 can include at least one processor 1001 that is able to execute instructions stored in one or more memories 1002. The one or more memories 1002 can include instructions for running an operating system, instructions for running one or more applications within the operating system, a system management agent and any other kind of instructions. The at least one processor 1001 can generate information on a display component 1003. Display component 1003 can include one or more of a display driver, a display card, display or any other hardware and/or software required to display an image or series of images. Computing device 1000 can also include a network interface 1004 that allows the device to send and receive information signals via a network. Network interface 1004 can include any type of network adapter for connecting to a network, such as an adapter to establish a connection to the Internet, to a wired or wireless intranet, to a cellular network or to a wireless network. Computing device 1000 can also include a user interface 1005. User interface 1005 can include one or more components, such as display 902, one or more hard buttons 903, speaker 904, microphone 905 and optical devices 906, that can provide information to a user and/or receive inputs from a user. User interface 1005 can also include one or more external components, such as an external keyboard, external mouse, external microphone, external speaker and the like.

Computing device 1000 can include a power source 1006. Power source 1006 can provide power to any or all of the other components in computing device 1000. As depicted in FIG. 10, power source 1006 can be connected to, and provide power to, each of processor 1001, memory 1002, display 1003, network interface 1004 and user interface 1005. Power source can be any type of power source, such as one or more disposable batteries, a rechargeable battery and the like. In the embodiment where computing device 1000 is a portable device, such as a laptop computer, a tablet computer, a cell phone, a handheld computer and the like, the power source 1006 may need to provide power for a period of time during recharging of the power source 1006. When power source 1006 is not connected to an external power source, computing device 1000 is drawing on the power stored in power source 1006. The capacity of power source 1006 can vary with the type and size of power source 1006. The rate at which power source 1006 discharges depends on a number of factors, such as which components of computing device 1000 are active, how much power each of the active components are drawing from power source 1006 and the like.

Figure 11:
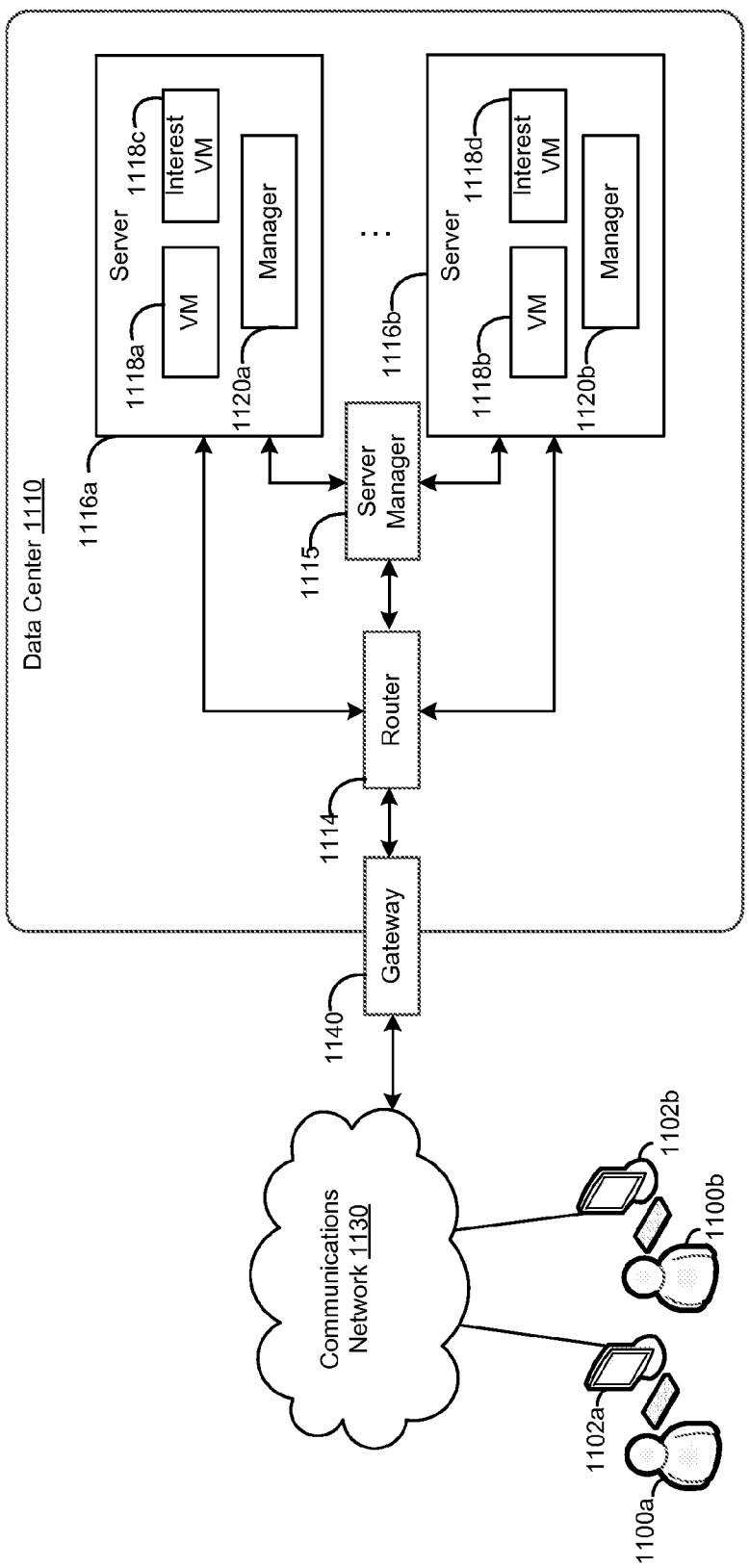
FIG. 11 illustrates an example computing environment in which the embodiments described herein may be implemented.

FIG. 11 illustrates an example computing environment in which the embodiments described herein may be implemented. FIG. 11 is a diagram schematically illustrating an example of a data center 1110 that can provide computing resources to users 1100a and 1100b (which may be referred herein singularly as user 1100 or in the plural as users 1100) via user computers 1102a and 1102b (which may be referred herein singularly as computer 1102 or in the plural as computers 1102) via a communications network 1130. Data center 1110 may be configured to provide computing resources for executing applications on a permanent or an as-needed basis. The computing resources provided by data center 1110 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 1110 may include servers 1116a-b (which may be referred herein singularly as server 1116 or in the plural as servers 1116) that provide computing resources. These resources may be available as bare metal resources or as virtual machine instances 1118a-d and (which may be referred herein singularly as virtual machine instance 1118 or in the plural as virtual machine instances 1118). Virtual machine instances 1118c and 1118d are interest virtual machine instances. The interest virtual machine instances 1118c and 1118d may be configured to perform all or any portion of the encoding techniques based on areas of interest in accordance with the present disclosure and described in detail below. As should be appreciated, while the particular example illustrated in FIG. 11 includes one interest virtual machine in each server, this is merely an example. A server may include more than one interest virtual machine or may not include any interest virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 11, communications network 1130 may, for example, be a publicly accessible network of linked networks and possibly operated by various distinct parties, such as the Internet. In other embodiments, communications network 1130 may be a private network, such as, a corporate or university network that is wholly or partially inaccessible to non-privileged users. In still other embodiments, communications network 1130 may include one or more private networks with access to and/or from the Internet.

Communications network 1130 may provide access to computers 1102. User computers 1102 may be computers utilized by users 1100 or other customers of data center 1110. For instance, user computer 1102a or 1102b may be a server, a desktop or laptop personal computer, a tablet computer, a wireless telephone, a personal digital assistant (PDA), an e-book reader, a game console, a set-top box or any other computing device capable of accessing data center 1110. User computer 1102a or 1102b may connect directly to the Internet (e.g., via a cable modem or a Digital Subscriber Line (DSL)). Although only two user computers 1102a and 1102b are depicted, it should be appreciated that there may be multiple user computers.

User computers 1102 may also be utilized to configure aspects of the computing resources provided by data center 1110. In this regard, data center 1110 might provide a gateway or web interface through which aspects of its operation may be configured through the use of a web browser application program executing on user computer 1102. Alternately, a stand-alone application program executing on user computer 1102 might access an application programming interface (API) exposed by data center 1110 for performing the configuration operations. Other mechanisms for configuring the operation of various web services available at data center 1110 might also be utilized.

Servers 1116 shown in FIG. 11 may be standard servers configured appropriately for providing the computing resources described above and may provide computing resources for executing one or more web services and/or applications. In one embodiment, the computing resources may be virtual machine instances 1118. In the example of virtual machine instances, each of the servers 1116 may be configured to execute an instance manager 1120a or 1120b (which may be referred herein singularly as instance manager 1120 or in the plural as instance managers 1120) capable of executing the virtual machine instances 1118. The instance managers 1120 may be a virtual machine monitor (VMM) or another type of program configured to enable the execution of virtual machine instances 1118 on server 1116, for example. As discussed above, each of the virtual machine instances 1118 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 1110 shown in FIG. 11, a router 1114 may be utilized to interconnect the servers 1116a and 1116b. Router 1114 may also be connected to gateway 1140, which is connected to communications network 1130. Router 1114 may be connected to one or more load balancers and, alone or in combination, may manage communications within networks in data center 1110, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 1110 shown in FIG. 11, a server manager 1115 is also employed to at least in part direct various communications to, from and/or between servers 1116a and 1116b. While FIG. 11 depicts router 1114 positioned between gateway 1140 and server manager 1115, this is merely an exemplary configuration. In some cases, for example, server manager 1115 may be positioned between gateway 1140 and router 1114. Server manager 1115 may, in some cases, examine portions of incoming communications from user computers 1102 to determine one or more appropriate servers 1116 to receive and/or process the incoming communications. Server manager 1115 may determine appropriate servers to receive and/or process the incoming communications based on factors such as an identity, location or other attributes associated with user computers 1102, a nature of a task with which the communications are associated, a priority of a task with which the communications are associated, a duration of a task with which the communications are associated, a size and/or estimated resource usage of a task with which the communications are associated and many other factors. Server manager 1115 may, for example, collect or otherwise have access to state information and other information associated with various tasks in order to, for example, assist in managing communications and other operations associated with such tasks.

It should be appreciated that the network topology illustrated in FIG. 11 has been greatly simplified and that many more networks and networking devices may be utilized to interconnect the various computing systems disclosed herein. These network topologies and devices should be apparent to those skilled in the art.

It should also be appreciated that data center 1110 described in FIG. 11 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 12:
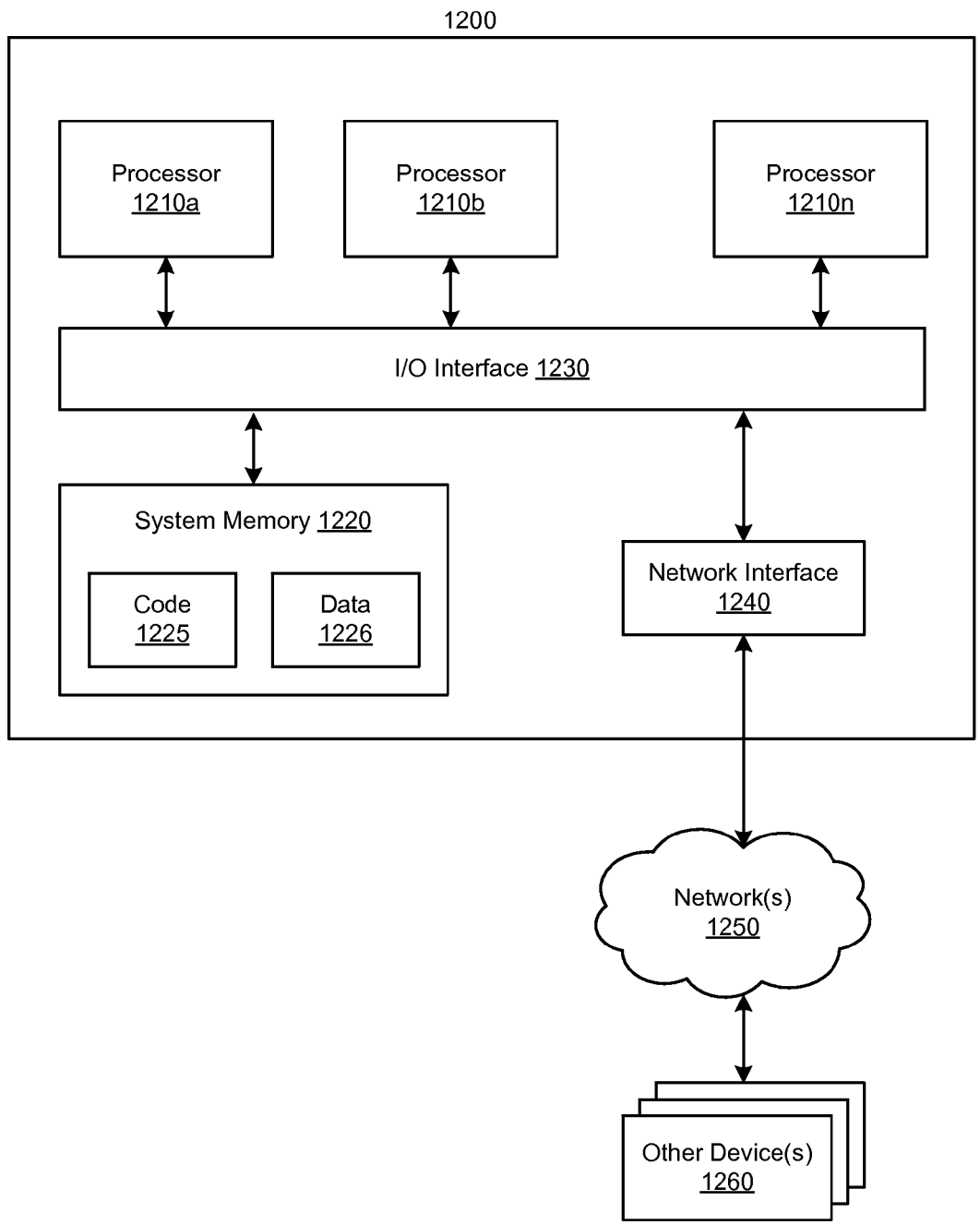
FIG. 12 depicts a general-purpose computer system that includes or is configured to access one or more computer-accessible media.

In at least some embodiments, a server that implements a portion or all of one or more of the technologies described herein may include a general-purpose computer system that includes or is configured to access one or more computer-accessible media. FIG. 12 depicts a general-purpose computer system that includes or is configured to access one or more computer-accessible media. In the illustrated embodiment, computing device 1200 includes one or more processors 1210a, 1210b and/or 1210n (which may be referred herein singularly as "processor 1210" or in the plural as "processors 1210") coupled to a system memory 1220 via an input/output (I/O) interface 1230. Computing device 1200 further includes a network interface 1240 coupled to I/O interface 1230.

In various embodiments, computing device 1200 may be a uniprocessor system including one processor 1210 or a multiprocessor system including several processors 1210 (e.g., two, four, eight or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC or MIPS ISAs or any other suitable ISA. In multiprocessor systems, each of processors Y may commonly, but not necessarily, implement the same ISA.

System memory 1220 may be configured to store instructions and data accessible by processor(s) 1210. In various embodiments, system memory 1220 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 1220 as code 1225 and data 1226.

In one embodiment, I/O interface 1230 may be configured to coordinate I/O traffic between processor 1210, system memory 1220 and any peripherals in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other device or devices 1260 attached to a network or networks 1250, such as other computer systems or devices, for example. In various embodiments, network interface 1240 may support communication via any suitable wired or wireless general data networks, such as types of Ethernet networks, for example. Additionally, network interface 1240 may support communication via telecommunications/telephony networks, such as analog voice networks or digital fiber communications networks, via storage area networks, such as Fibre Channel SANs (storage area networks) or via any other suitable type of network and/or protocol.

In some embodiments, system memory 1220 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1200 via I/O interface 1230. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals, such as electrical, electromagnetic or digital signals conveyed via a communication medium, such as a network and/or a wireless link, such as those that may be implemented via network interface 1240. Portions or all of multiple computing devices, such as those illustrated in FIG. 12, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity, such as a company or a public sector organization, that provides one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++ and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Thus, as set forth above, a content provider may provide content to a destination over a network, such as the Internet, using, for example, streaming content delivery techniques. A content provider may, for example, provide a content delivery service that may reside on one or more servers. The service may be scalable to meet the demands of one or more customers and may increase or decrease in capability based on the number and type of incoming client requests. The content delivery service may, in some cases, process a content item in parallel across multiple nodes of the content delivery service. This may be done, in one embodiment, to reduce the latency for rendering the content item. Portions of the content delivery service may also be migrated to be placed in a position of reduced latency with a requesting client. In some cases, the content provider may determine an "edge" of a system or network associated with the content provider that is physically and/or logically closest to a requesting client. The content provider may then, for example, "spin-up," migrate resources or otherwise employ components associated with the determined edge for interacting with requests from the client. Such an edge determination process may, in some cases, provide an efficient technique for identifying and employing components that are well-suited to interact with a particular client, and may, in some embodiments, reduce the latency for communications between a content provider and one or more clients.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   a plurality of data centers, wherein each of the plurality of data centers comprises a host management service and a plurality of hosts running at least one application; and
   a token redemption node configured to receive token redemption requests from client computing devices;
   wherein the token redemption node is operative to determine, in response to receiving a token redemption request from a client computing device, a destination host management service in a first data center of the plurality of data centers based at least in part on a geographic proximity between the destination host management service and the client computing device and route the token redemption request to the destination host management service; and
   wherein the destination host management service is operative to determine, in response to receiving the token redemption request, a destination host running an application in one of the plurality of data centers and provision a session between the client computing device and the application running in the destination host.

2. The system of claim 1, wherein the token redemption node is operative to determine the destination host management service based at least on latency of communication between the client computing device and the destination host management service.

3. The system of claim 1, wherein one of the plurality of data centers comprises a database operating to store state information for sessions between client computing devices and applications running on hosts in the plurality of data centers.

4. The system of claim 1, wherein the destination host is located in one of the first data center or a second data center of the plurality of data centers.

5. The system of claim 1, wherein hosts operating a same application in the plurality of data centers are arranged in a virtual private cloud.

6. A method comprising:
   receiving, by a node operating in a computing system, a token redemption request from a client computing device;
   determining, by the node, a destination host management service based at least in part on a geographic proximity of the destination host management service to the client computing device, wherein the destination host management service is one of a plurality of host management systems distributed across a plurality of data centers;
   routing, by the node, the token redemption request to the destination host management service;
   determining, by the destination host management service, a destination host running an application in one of the plurality of data centers; and
   provisioning, by the destination host management service, a session between the client computing device and the application running in the destination host.

7. The method of claim 6, wherein determining the destination host management service is based at least in part on latency of communication between the client computing device and the destination host management service.

8. The method of claim 7, wherein determining the destination host management service comprises comparing the IP address of the client computing device to an IP address of the destination host management service.

9. The method of claim 6, wherein determining the destination host comprises identifying an available host in one of the plurality of data centers, and wherein the destination host management is located in the one of the plurality of data centers.

10. The method of claim 6, wherein determining the destination host comprises identifying an active session between the application running on the destination host and another client computing device.

11. The method of claim 10, wherein the application running on the destination host is a multi-tenant application.

12. The method of claim 11, wherein the destination host running the multi-tenant application and the destination host management service are located in different ones of the plurality of data centers.

13. The method of claim 6, wherein provisioning the session between the client computing device and the application running in the destination host comprises sending, by the destination host management service, session information to the client computing device.

14. The method of claim 13, wherein the session information comprises information enabling the client computing device to initiate a direct connection with the destination host.

15. The method of claim 13, wherein the session information comprises session authentication information, and wherein the destination host is configured to authenticate the client computing device in response to receiving the session authentication information from the client computing device.

16. The method of claim 6, wherein the token redemption request comprises a token generated by one of a plurality of host management services.

17. A non-transitory computer-readable medium having embodied thereon computer-readable instructions, the computer-readable instructions comprising instructions that, when executed by a computing system, at least cause:

receiving, by a node operating in the computing system, a token redemption request from a client computing device;

determining, by the node, a destination host management service based at least in part on a geographic proximity of the destination host management service is located to the client computing device;

routing, by the node, the token redemption request to the destination host management service; and determining, by the destination host management service operating in the computing system, a destination host running an application in one of a plurality of data centers; and provisioning, by the destination host management service, a session between the client computing device and the application running in the destination host.

18. The non-transitory computer-readable medium of claim 17, wherein the computer-readable instructions further comprise instructions that, when executed by the computing system, at least cause:

storing state information about the session in a database.

19. The non-transitory computer-readable medium of claim 18, wherein the database and the destination host are located in different ones of the plurality of data centers.

20. The non-transitory computer-readable medium of claim 18, wherein hosts in different ones of the plurality of data centers running a same application are arranged in a virtual private cloud.

21. The non-transitory computer-readable medium of claim 20, wherein state information for each session with the hosts in the different ones of the plurality of data centers running the same application is stored in the database.

* * * * *